(12) United States Patent
Nelson et al.

(10) Patent No.: US 10,678,418 B1
(45) Date of Patent: Jun. 9, 2020

(54) GRAPHICAL USER INTERFACES FOR DEFINING COMPLEX DATA OBJECTS

(71) Applicant: ServiceNow, Inc., Santa Clara, CA (US)

(72) Inventors: Harry Thomas Nelson, San Diego, CA (US); Joshua Timothy Nerius, Chicago, IL (US); Jacob Samuel Burman, Carlsbad, CA (US); Venkata Kiran Kumar Koya, Poway, CA (US); Rebecca Anita Dias, Seattle, WA (US); Alberto Alvarado Jimenez, Santee, CA (US)

(73) Assignee: SERVICENOW, INC., Santa Clara, CA (US)

( * ) Notice: Subject to any disclaimer, the term of this patent is extended or adjusted under 35 U.S.C. 154(b) by 0 days.

(21) Appl. No.: 16/358,081

(22) Filed: Mar. 19, 2019

(51) Int. Cl.
*G06F 3/0484* (2013.01)
*G06F 16/25* (2019.01)
*G06F 3/0486* (2013.01)
*G06F 3/0482* (2013.01)

(52) U.S. Cl.
CPC ........ *G06F 3/04847* (2013.01); *G06F 3/0482* (2013.01); *G06F 3/0486* (2013.01); *G06F 16/252* (2019.01)

(58) Field of Classification Search
CPC .... G06F 11/0766; G06F 3/0482; G06F 16/34; G06F 16/954; G06F 3/0481
See application file for complete search history.

(56) References Cited

U.S. PATENT DOCUMENTS

| 2007/0168882 | A1* | 7/2007 | Moehrle | G06F 3/0482 715/810 |
| 2008/0059912 | A1* | 3/2008 | Scherpa | G06F 3/0481 715/853 |
| 2010/0169832 | A1* | 7/2010 | Chang | G06F 16/954 715/811 |
| 2013/0007671 | A1* | 1/2013 | Hammontree | G06F 16/34 715/853 |

(Continued)

OTHER PUBLICATIONS

"ServiceNow London IT Operations Management", ServiceNow Docs, Mar. 12, 2019, 88 pages.

(Continued)

*Primary Examiner* — Toan H Vu
(74) *Attorney, Agent, or Firm* — Fletcher Yoder, P.C.

(57) ABSTRACT

A system may involve persistent storage defining primitive data types and compound data types, where the compound data types include objects and arrays, where the objects contain sets of elements that have various primitive data types, compound data types, or both, and where the arrays contain sets of elements that all have one particular primitive data type or compound data type. The system may also involve one or more processors configured to provide a representation of a graphical user interface for designing a hierarchy of elements, each of the elements therein having a data type that is either a primitive data type or a compound data type, where elements in the hierarchy are associated with data type change controls, and where object elements in the hierarchy are: (i) associated with child element controls, and (ii) represented as collapsible menu items that can either display or hide their child elements.

20 Claims, 27 Drawing Sheets

(56) References Cited

U.S. PATENT DOCUMENTS

| | | | |
|---|---|---|---|
| 2015/0052459 A1* | 2/2015 | Sunil | G06F 3/0482 715/760 |
| 2015/0277672 A1* | 10/2015 | Wang | G06F 3/0482 715/811 |
| 2016/0259651 A1* | 9/2016 | Nychis | G06F 11/0766 |
| 2018/0321654 A1 | 11/2018 | Tucker | |

OTHER PUBLICATIONS

"ServiceNow London Platform Capabilities", ServiceNow Docs, Mar. 12, 2019, 354 pages.

Nelson, U.S. Appl. No. 16/133,438, filed Sep. 17, 2018, 43 pages.

* cited by examiner

| Offboarding | Status: Draft | App: User Management | Edit | Test | Copy | Save | Activate |

| Action | | State | Start time | Duration |
|---|---|---|---|---|
| | 1. Look up records in [sc_request] when requested for is Trigger->[sys_user] Record | Complete | 09:08:15 | 120ms |
| | 2. For each item in 1->[sc_request] Records | Complete | 09:08:15 | 2195ms |
| | 2.1. Update 2->[sc_request] Record (Request state->Closed cancelled, Comments->"User no longer with company") | Complete | 09:08:16 | 796ms |
| Action | 3. Look up records in [task] when assigned to is Trigger->[sys_user] Record | Complete | 09:08:17 | 43ms |
| | 4. For each item in 3->[task] Records | Complete | 09:08:17 | 338ms |
| | 4.1. Update 4->[task] Record (Assigned to->Trigger->[sys_user]->Manager) | Complete | 09:08:17 | 70ms |

GRAPHICAL USER INTERFACES FOR DEFINING COMPLEX DATA OBJECTS

BACKGROUND

Structured data formats can be defined in various ways such as with JavaScript Object Notation (JSON) and the eXtensible Markup Language (XML). Using these formats, schema for complex data objects can be specified. These objects may include one or more interrelated elements organized into a hierarchy. Thus, they can be used to encode and/or store arbitrary collections of data. In particular, JSON and XML (as well as various other formats) are commonly used for machine-to-machine communication as well as storing information (e.g., to a file) in a human-readable form.

Nonetheless, structured data schema can be quite intricate, with an arbitrary number of elements per example, an arbitrarily deep nesting of elements, and support for arrays of elements. Thus, even for experienced users, reading a JSON or XML file and understanding the organization of the data therein can be a painstaking task. And for non-technical users, it may be a barrier that prevents these users from interacting with various software applications that employ such schema.

SUMMARY

The embodiments herein address these challenges by providing a set of graphical user interfaces (GUIs) that allow a user to visually specify a complex data object. In particular, the user may add, remove, and configure individual elements of a complex data object. While doing so, the GUIs provide a clear explanation of the name and type of each element, as well as its position (e.g., level of nesting) in the overall hierarchy and whether it represents an array or object containing further elements. This allows even non-technical users to design actions. These actions using complex data object as input and/or output containers can be incorporated into workflows.

Accordingly, a first example embodiment may involve persistent storage defining primitive data types and compound data types, where the compound data types include objects and arrays, where the objects are capable of containing user-defined sets of member elements that have various primitive data types, compound data types, or both, and where the arrays are capable of containing user-defined sets of member elements that all have one particular primitive data type or compound data type. One or more processors may be configured to: provide a representation of a GUI for designing a hierarchy of elements corresponding to a complex data object, each of the elements therein having a respective data type that is either one of the primitive data types or one of the compound data types, where all elements in the hierarchy are associated with data type change controls, and where object elements in the hierarchy are: (i) associated with respective new child element controls, and (ii) represented as collapsible menu items that can either display or hide their respective child elements. The one or more processors may be further configured to: possibly in response to selection of a data type change control corresponding to a particular element of the hierarchy: display, by way of the GUI, a menu that allows selection of a new data type from a list of data types, and change the data type of the particular element as displayed on the GUI to be the new data type. The one or more processors may be further configured to: in response to selection of a new child element control corresponding to a particular object element of the hierarchy: add, by way of the GUI, a representation of a new child element to the hierarchy as a child of the particular object element.

A second example embodiment may involve obtaining, from persistent storage, definitions of primitive data types and compound data types, where the compound data types include objects and arrays, where the objects are capable of containing user-defined sets of member elements that have various primitive data types, compound data types, or both, and where the arrays are capable of containing user-defined sets of member elements that all have one particular primitive data type or compound data type. The second example embodiment may further involve providing, by a computing device, a representation of a GUI for designing a hierarchy of elements corresponding to a complex data object, each of the elements therein having a respective data type that is either one of the primitive data types or one of the compound data types, where all elements in the hierarchy are associated with data type change controls, and where object elements in the hierarchy are: (i) associated with respective new child element controls, and (ii) represented as collapsible menu items that can either display or hide their respective child elements. The second example embodiment may further involve, possibly in response to selection of a data type change control corresponding to a particular element of the hierarchy: displaying, by way of the GUI, a menu that allows selection of a new data type from a list of data types, and changing the data type of the particular element as displayed on the GUI to be the new data type. The second example embodiment may further involve, possibly in response to selection of a new child element control corresponding to a particular object element of the hierarchy: adding, by way of the GUI, a representation of a new child element to the hierarchy as a child of the particular object element.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 6A, 6B, 6C, 6D, 6E, 6F, 6G, 6H, 6I, 6J, and 6K depict workflow design tool graphical user interfaces, in accordance with example embodiments.

DETAILED DESCRIPTION

Figure 1:
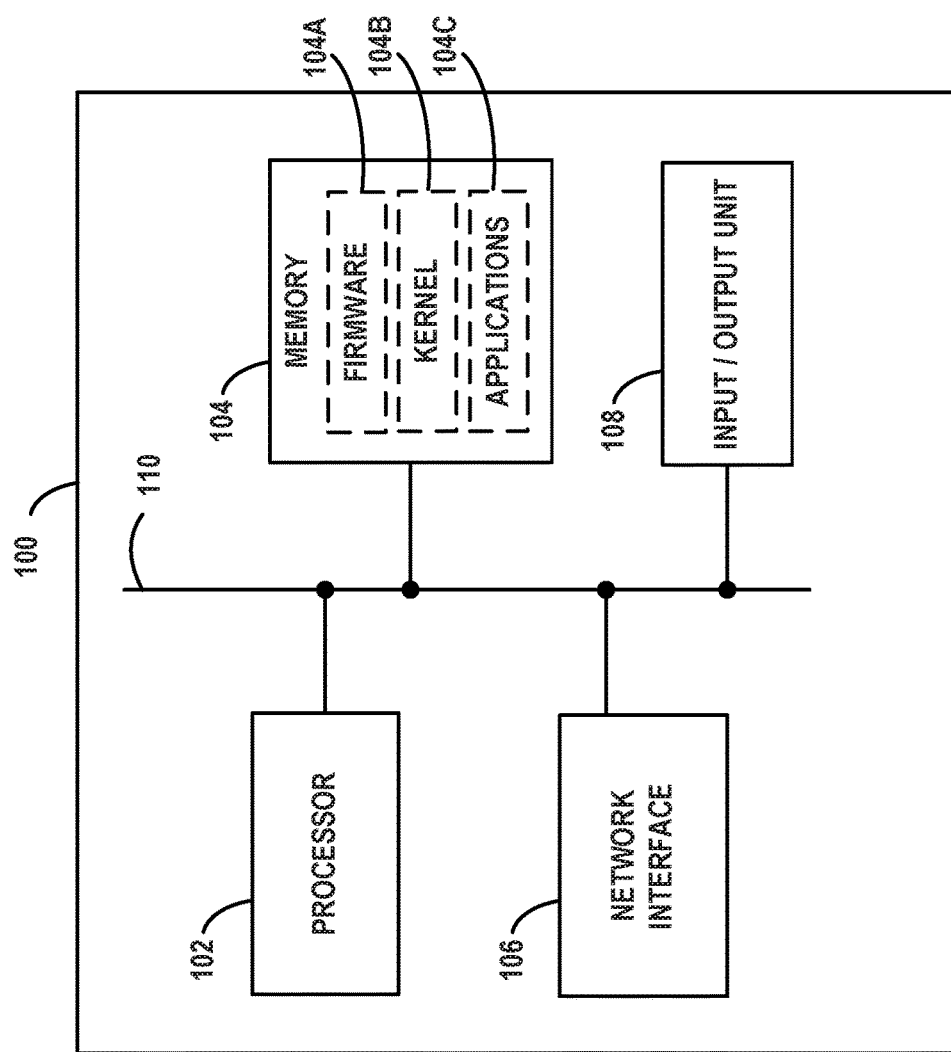
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
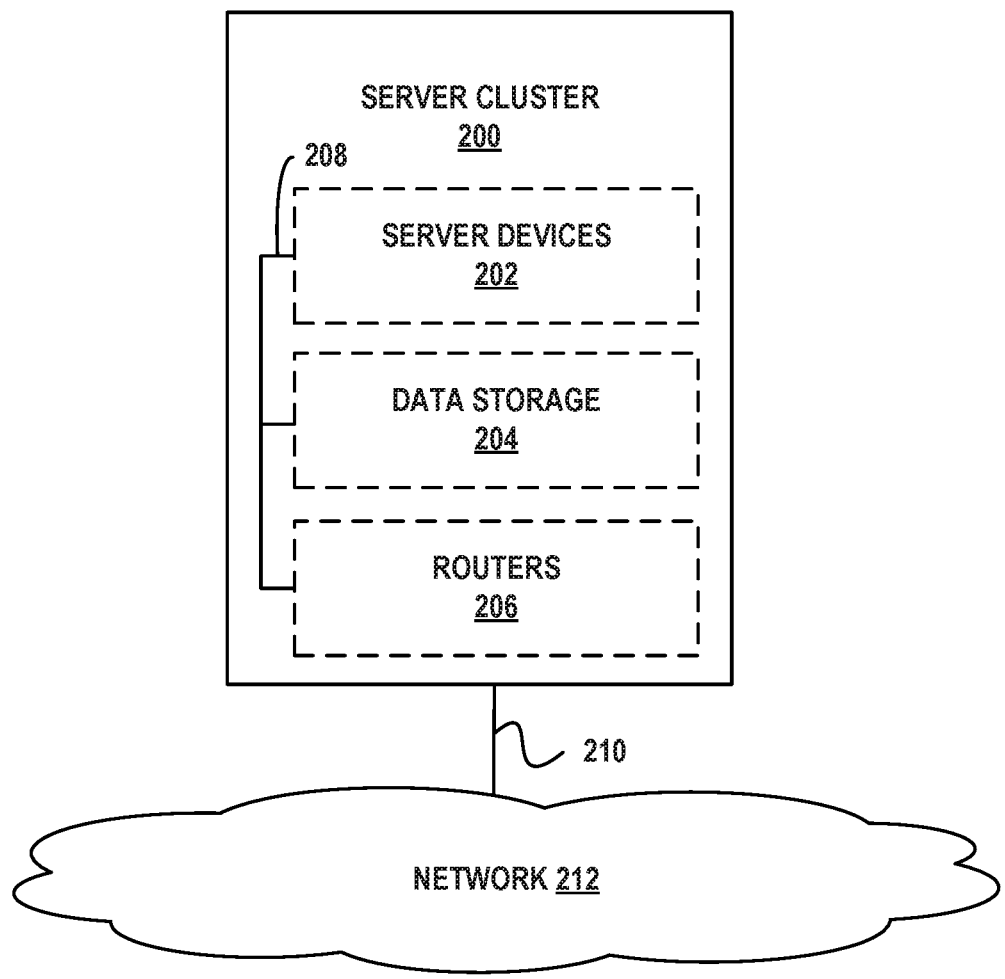
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
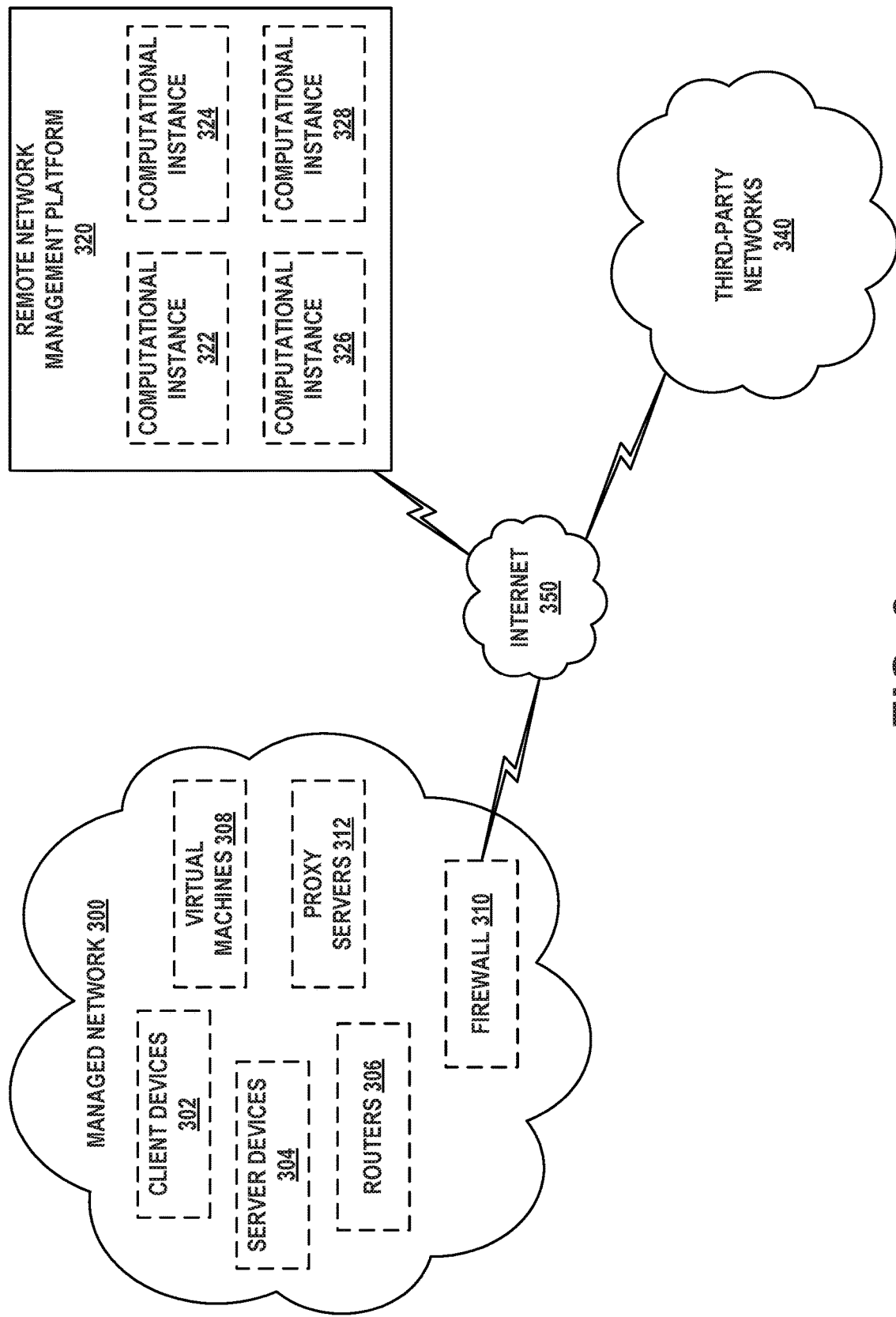
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
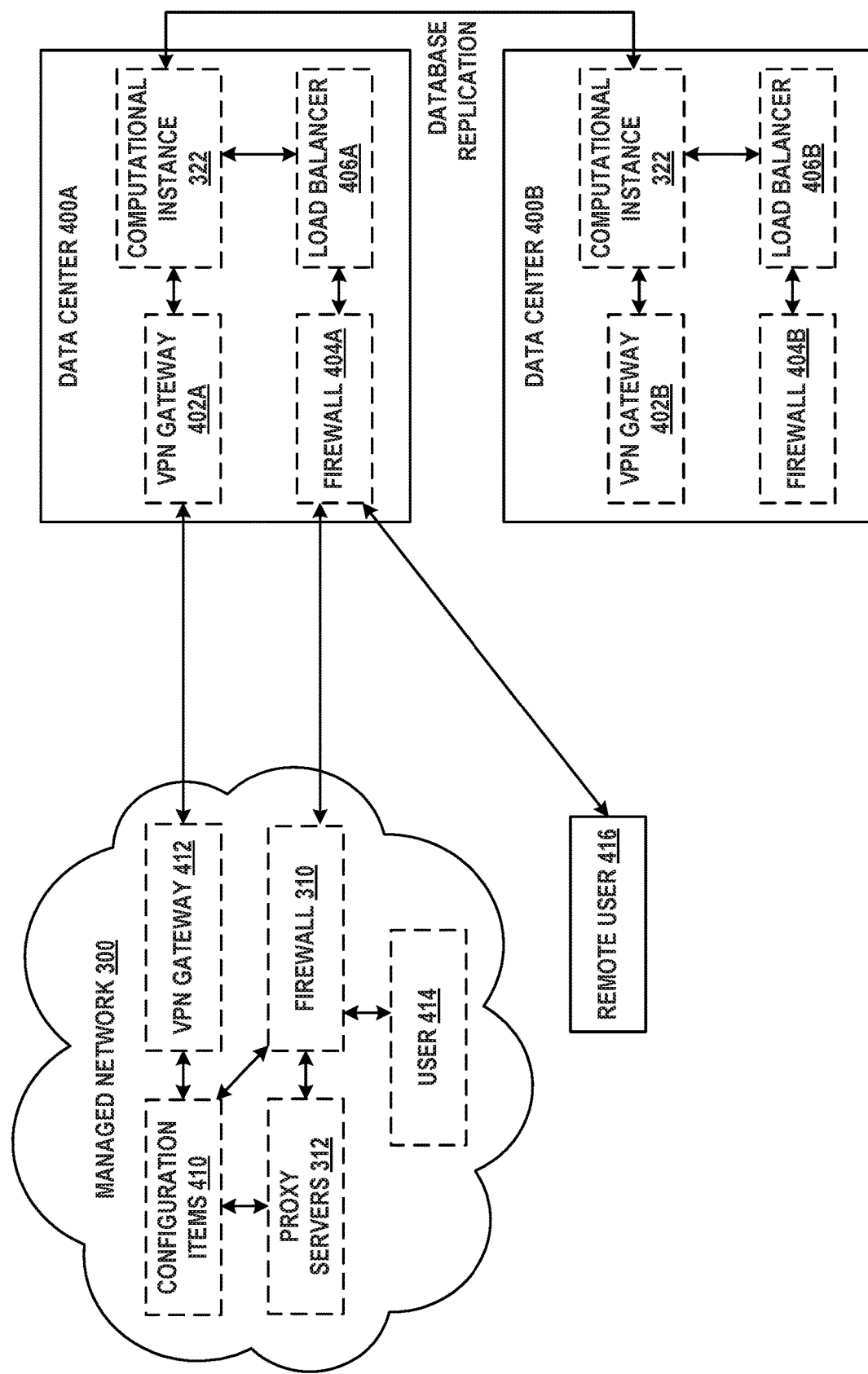
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
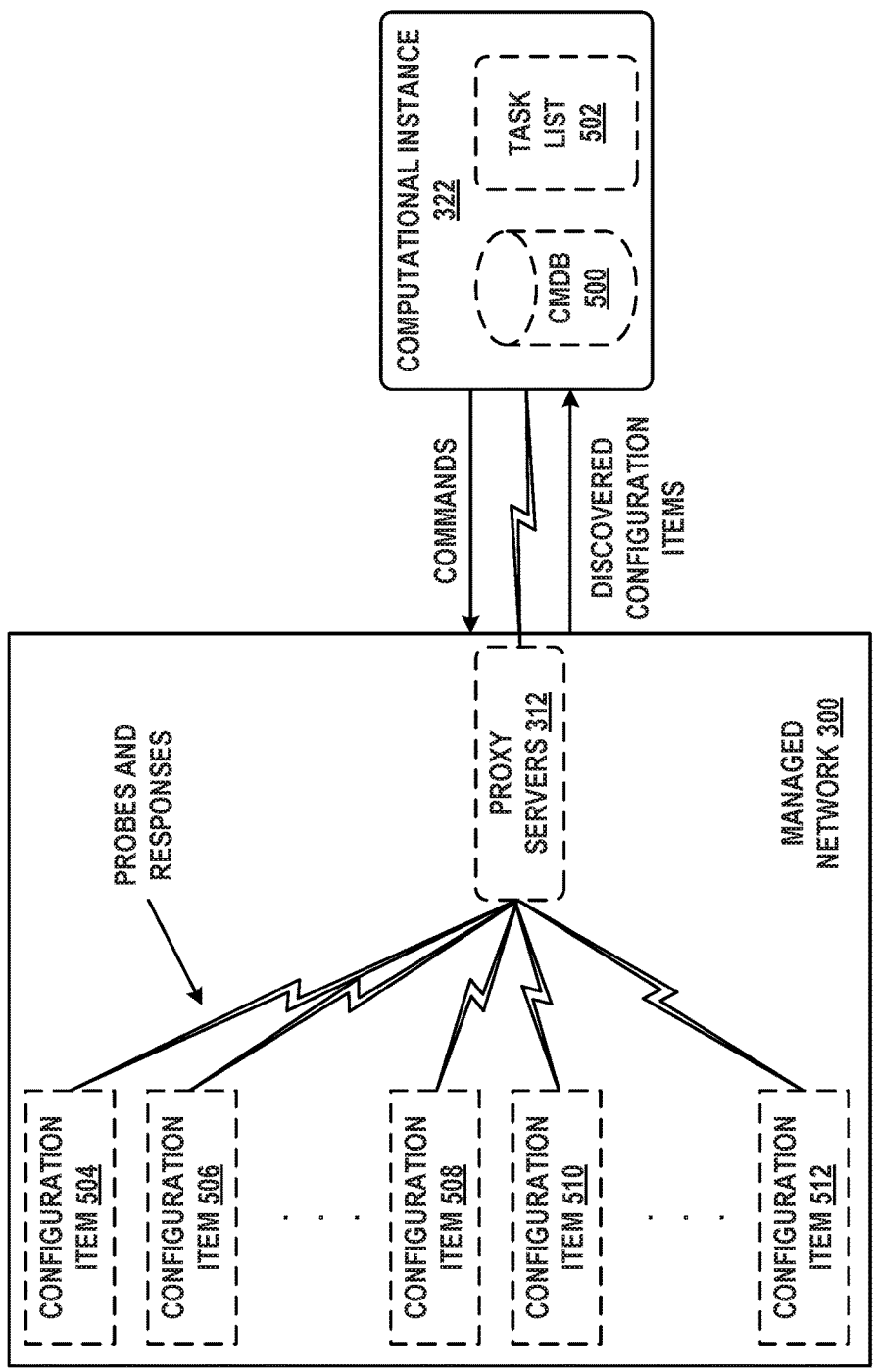
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined.

As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
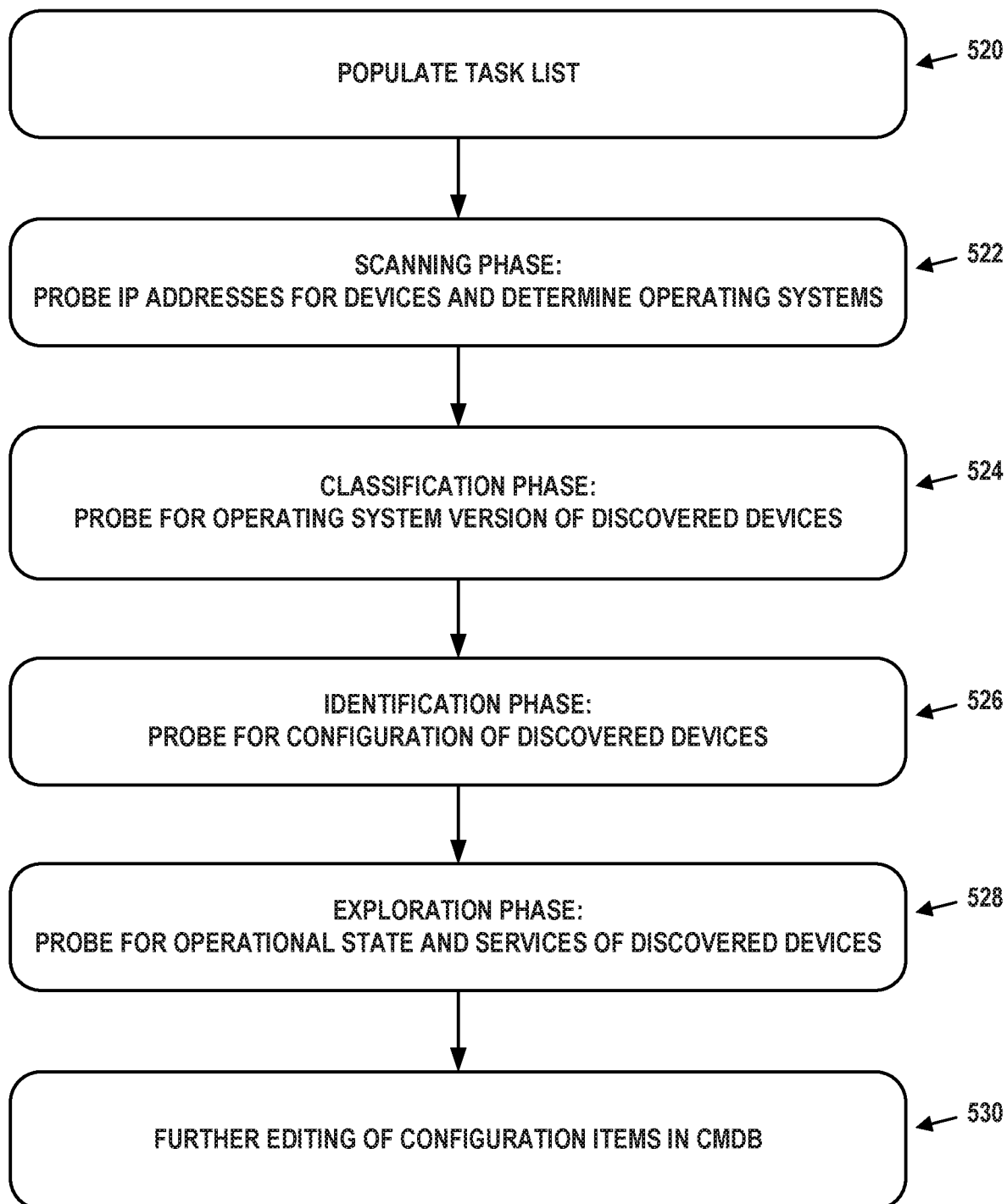
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE WORKFLOW DESIGN TOOL

Computational instances of the remote network management platform discussed herein may enable the specification and execution of workflows on behalf of their respective managed networks. A workflow is a specific sequence or series of tasks that, when performed, accomplish one or more goals. In some cases, workflows may be represented as flow charts, with one or more starting states, intermediate states, and ending states connected by various transitions therebetween. Some states may be visited zero times or more than one time. Also, some states may have more than one possible next state, thus representing a decision to be made in the workflow, either based on user input, automated input, information stored in a database, or by way of other mechanisms. Triggers may also be defined that cause certain transitions between states, input to be acquired, or output to be produced.

Such a workflow can be implemented on a computational instance through use of a software-based workflow design tool. Such a tool presents the workflow designer with options for defining the states, transitions, triggers, actions, input data, output data, and other characteristics of the workflow. The tool may utilize a GUI, and may be embodied as a series of one or more web pages and/or web-based applications deployed upon the computational instance. Once completed and released, employees of the managed network may make use of the workflow to carry out various tasks in an organized and efficient fashion. Notably, the workflow design tool can be a so-called "low-code/no-code" solution, with which designers either write very little program code, or no code at all, to implement the workflow.

While the embodiments herein provide support for general workflow design, an example workflow design tool may be implemented based around specific definitions of triggers, actions, and workflow logic. Triggers may be used to specify conditions that start a workflow, such as a change to an entry in a database (e.g., the addition or updating of a configuration item in a CMDB) or according to a schedule (e.g., once per day or once per week). A trigger causes one or more actions to be performed, and each action may be controlled by workflow logic that specifies the conditions that must be true for the action to be performed. The action may involve changing the state of information in a database, sending a notification (e.g., an email) to a user, and so on.

In some cases, sub-flows may be defined and incorporated into a workflow. A sub-flow may be an automated or semi-automated process including a sequence of reusable actions and specific data inputs that allow it to be started from within a flow, another sub-flow, or script. Thus, sub-flows can be applied to multiple workflows.

As an illustrative example of a workflow, consider an employee offboarding scenario, in which an employee has left an enterprise for some reason (e.g., the employee quit, got fired, passed away, etc.). The goals of the workflow are to: (i) look up and cancel any pending catalog requests (e.g., equipment requisitions) opened by the departed employee, and (ii) reassign any open tasks (e.g., pending approvals, units of work that are to be accomplished) assigned to the departed employee to his or her manager. In various embodiments, more or fewer goals may be present.

Figure 6A:
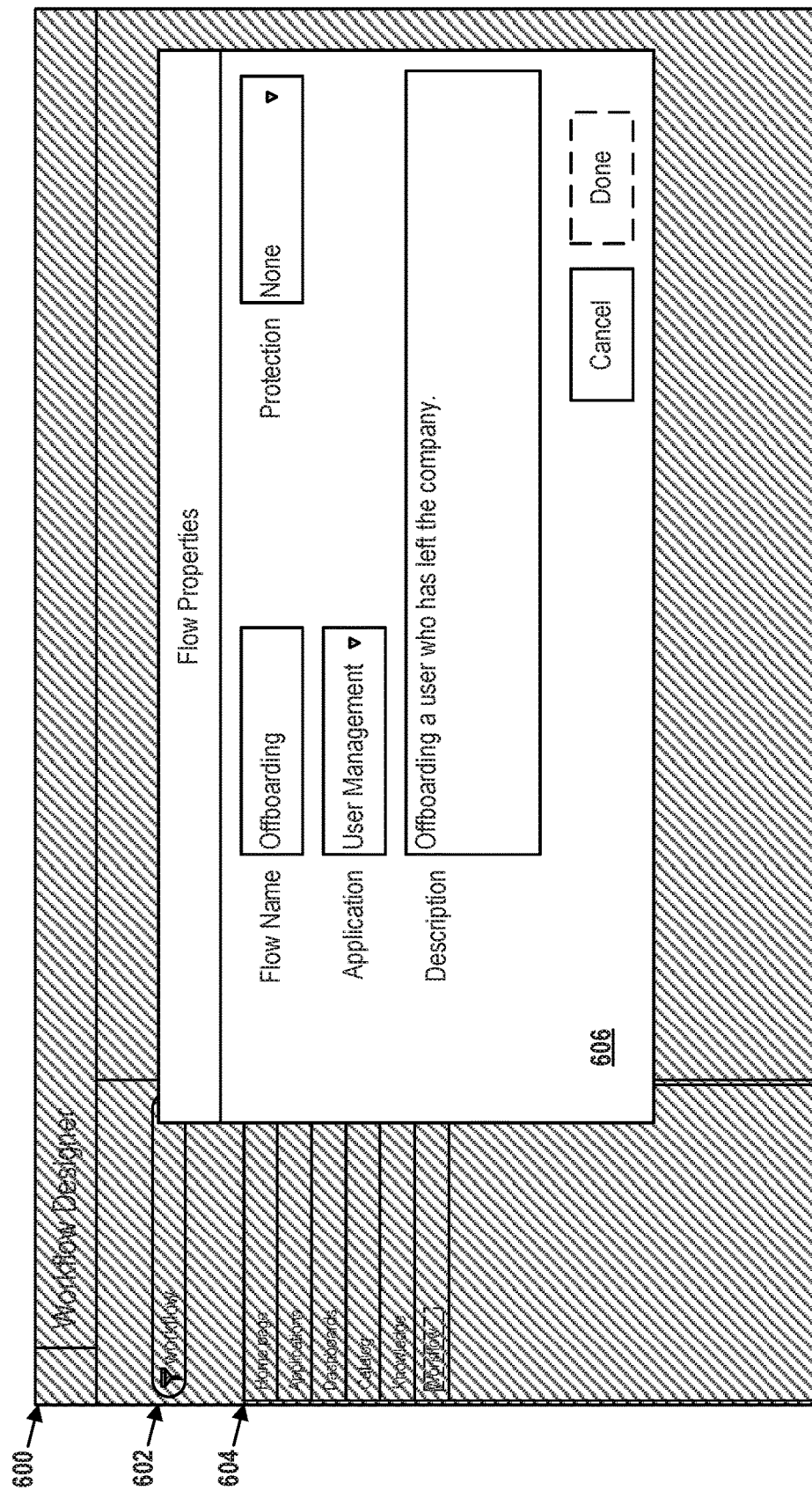

The workflow design tool may present the designer with a series of GUI pages that allow the designer to specify the workflow. Examples of such pages are shown in FIGS. 6A-6J, while results of an automated test of the workflow are shown in FIG. 6K. Notably, these examples are merely for purposes of illustration and not intended to be limiting. The workflow design tool may be able to provide other GUIs including alternative arrangements of information usable for designing workflows.

FIG. 6A depicts GUI 600. The background of GUI 600 shows a web-based menu for selecting features and/or applications supported by a computational instance. This background is denoted as such by hash marks.

For example, GUI 600 includes dialog box 602 in which a user has entered the search term "workflow". This selects the workflow design tool from the bottom of menu 604. This selection is reflected by the text "Workflow Designer" appearing at the top of GUI 600.

GUI 600 also includes pop up window 606. Alternatively, window 606 may be a pane overlaid on top of GUI 600 and not a separate window. Regardless, window 606 allows a user to initiate creation of a new workflow by specifying its properties. In GUI 600, these properties are the workflow's name "Offboarding", the workflow's scoped application "User Management", the workflow's description "Offboarding a user who has left the company", and whether the workflow is to be protected. In alternative embodiments more or fewer properties may be specified.

The workflow's name may be free-form text entered by the user. The workflow's scoped application may be selected from a drop-down menu of applications or specified as global. As the workflow in GUI 600 is limited to the "User Management" scoped application, this workflow may be considered to be part of this application. The workflow's description may also be free-form text. The workflow's protection specifies whether it is modifiable ("none") or read-only ("read-only") by other workflow designers or users.

Once the user is satisfied with the information entered in window 606, the user may select or otherwise activate the "Done" button. This selection is denoted in FIG. 6A by this button being depicted with a dashed line. Once the user completes the dialog of window 606, the next phase of the workflow design tool, which allows the user to specify a trigger, may be displayed.

Figure 6B:
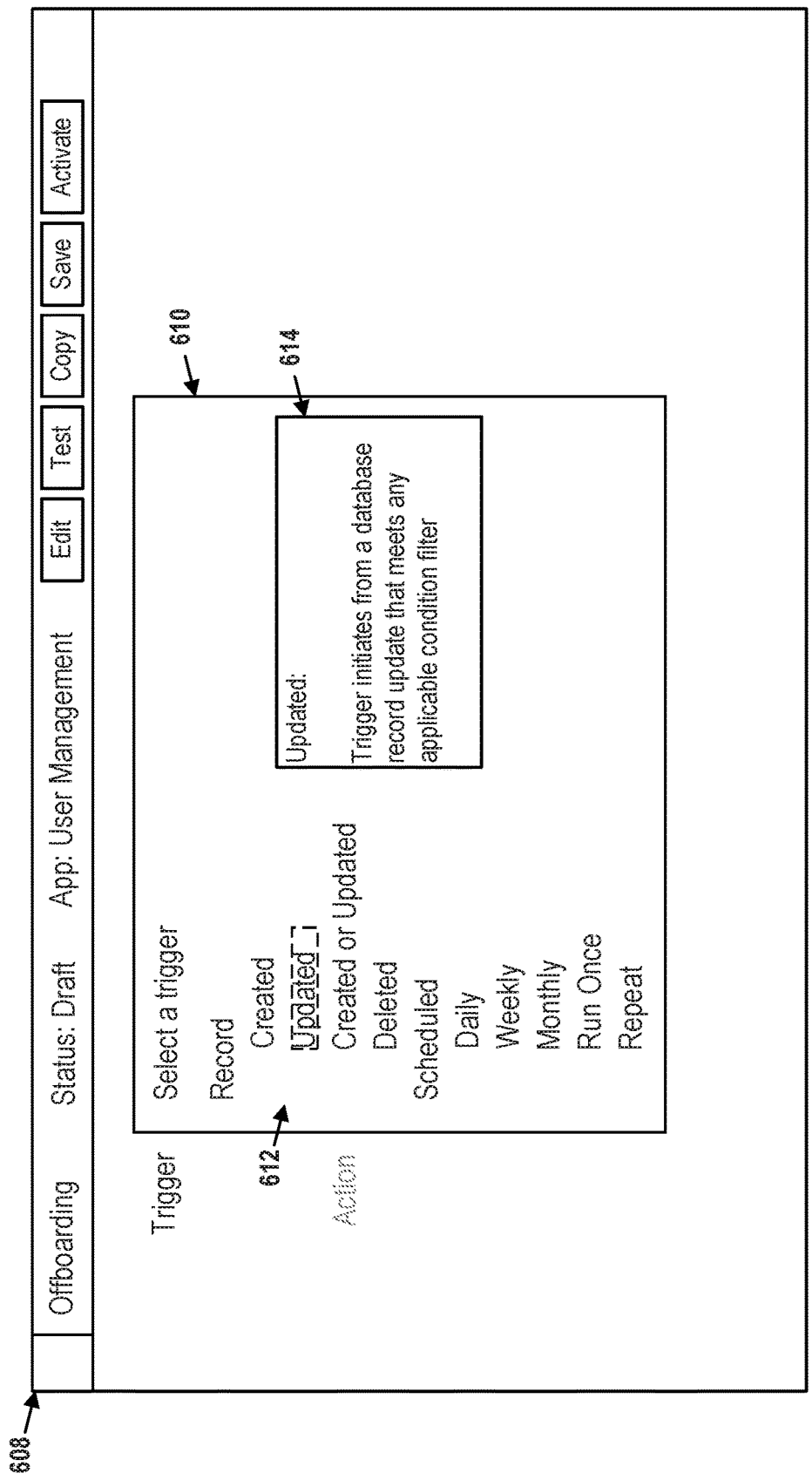

FIG. 6B depicts the first part of the trigger specification phase in GUI 608. The top of GUI 608 specifies the workflow's name, "Offboarding", as entered into window 606. This section of GUI 608 also indicates that this workflow is currently in draft form and is part of the "User Management" scoped application. GUI 608 further displays a series of buttons that allow a user to edit, test, copy, save, and activate the workflow, respectively. In alternative embodiments, different types of information about the workflow may be displayed, and there may be more or fewer buttons potentially with different functionality.

Notably, hashmarks are omitted from the background of GUI 608 (as well as all further GUIs) for purposes of readability. Also, the word "Trigger" is shown in a regular, dark color to indicate that a trigger is being specified, while the word "Action" is shown in a lighter color to indicate that action specification is not taking place.

Pop up window 610 (which, like window 606, may be a pane overlaid on top of GUI 608 and not a separate window), may allow a user to specify a trigger for the workflow. As noted previously, two main types of triggers may be supported and these types are shown in menu 612. Record-based triggers may cause a workflow to be performed when a change to one or more specific database records occurs. As depicted in menu 612, these changes may include creation of a record, updating of a record, creation or updating of a record, and deletion of a record. Scheduled triggers may cause a workflow to be performed at one or more specified times. As depicted in menu 612, such a schedule may trigger a workflow daily, weekly, monthly, just once (at a specified time), or to repeat at a user-specified interval.

In FIG. 6B, menu 612 indicates, with a dashed line, that the user has selected a trigger for when a record is updated. This may cause information box 614 to be displayed, which explains the behavior of the selected trigger.

Figure 6C:
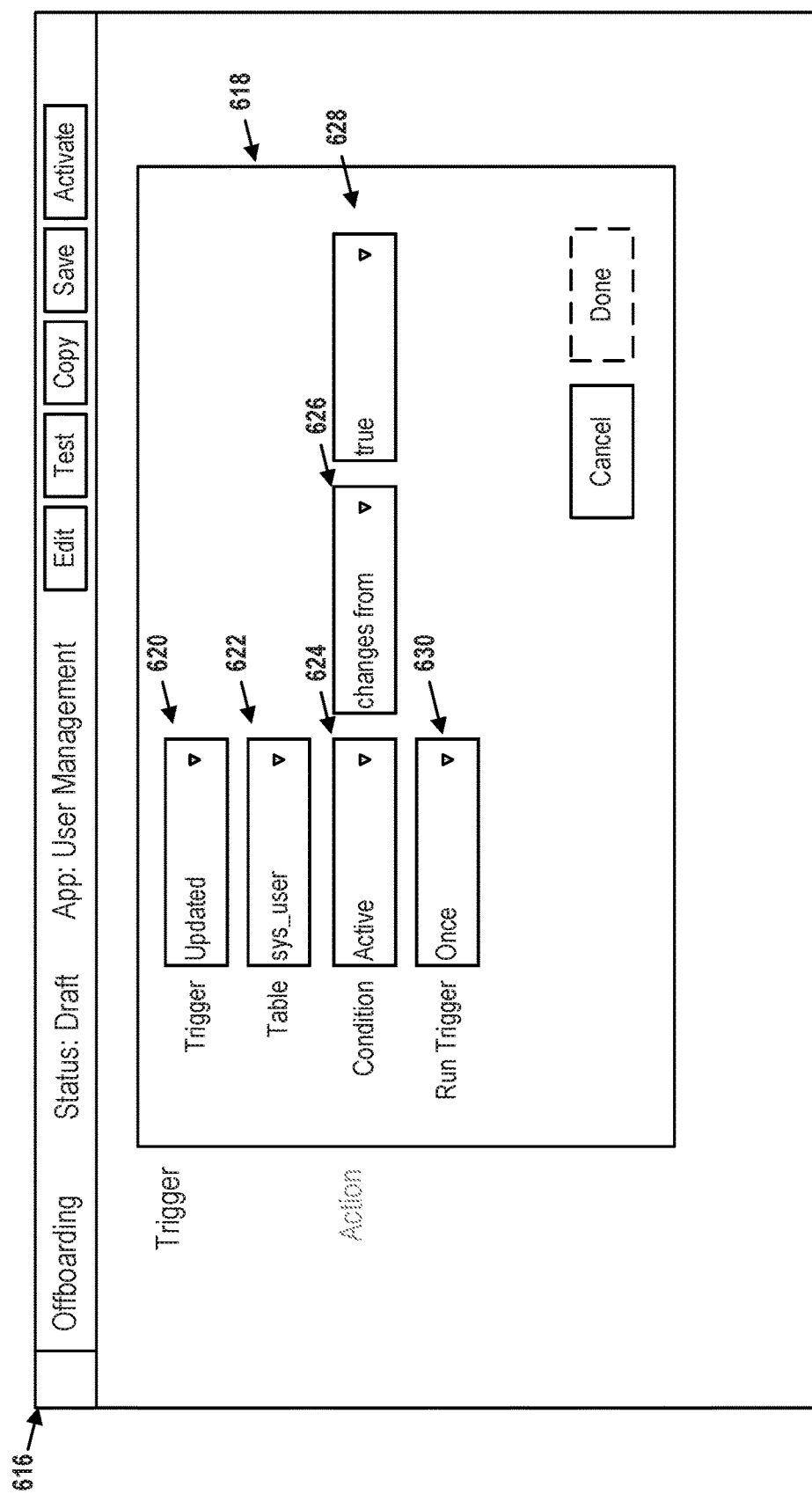

FIG. 6C depicts the second part of the trigger specification phase in GUI 616. GUI 616 assumes that the selection shown in FIG. 6B has been finalized. Thus, GUI 616 depicts pop up window 618 (which, like window 606, may be a pane overlaid on top of GUI 616 and not a separate window), that may allow a user to further specify a trigger for the workflow.

Window 618 contains a number of drop-down menus, some of which may be automatically populated based on the user's selection(s) from GUI 608. Particularly, trigger menu 620 may be populated to reflect the user's selection of the "Updated" option, and run trigger menu 630 may be populated to reflect that record-based triggers are expected to just run once. Nonetheless, the user may modify these selections in window 618.

Table menu 622 allows the user to specify a database table in which records can be found. As shown, this table is sys_user, which is assumed to contain one entry for each employee in the company. Table menu 622 may be capable of displaying a list of one or more available tables.

Condition menus 624, 626, and 628 allow the user to specify a condition of records in the selected table that will cause the workflow to be performed. This condition may be a state or a transition. For instance, condition menu 624 specifies "Active" to indicate that the records must be active, condition menu 626 specifies "changes from" to indicate records that change from active, and condition menu 628 specifies "true" to indicate any record that changes from active to another state.

In various embodiments, condition menu 624 may include entries for various fields in the sys_user table. These fields may include the phone number, building, city, department, address, manager, role, and so on. Condition menu 626 may include entries for "is", "is not", "is empty", "is not empty", "is anything", "is same as", "is different from" "changes", "changes from", "changes to", and/or various other logical operations. Condition menu 628 may include entries for items that are contextually based on the selections made for condition menus 624 and 626.

Viewed as a whole, the trigger specification of window 618 indicates that the workflow is to be performed once when any entry in the sys_user table is updated from active to another state (e.g., inactive). This would indicate that the user is no longer an active employee of the company.

Figure 6D:
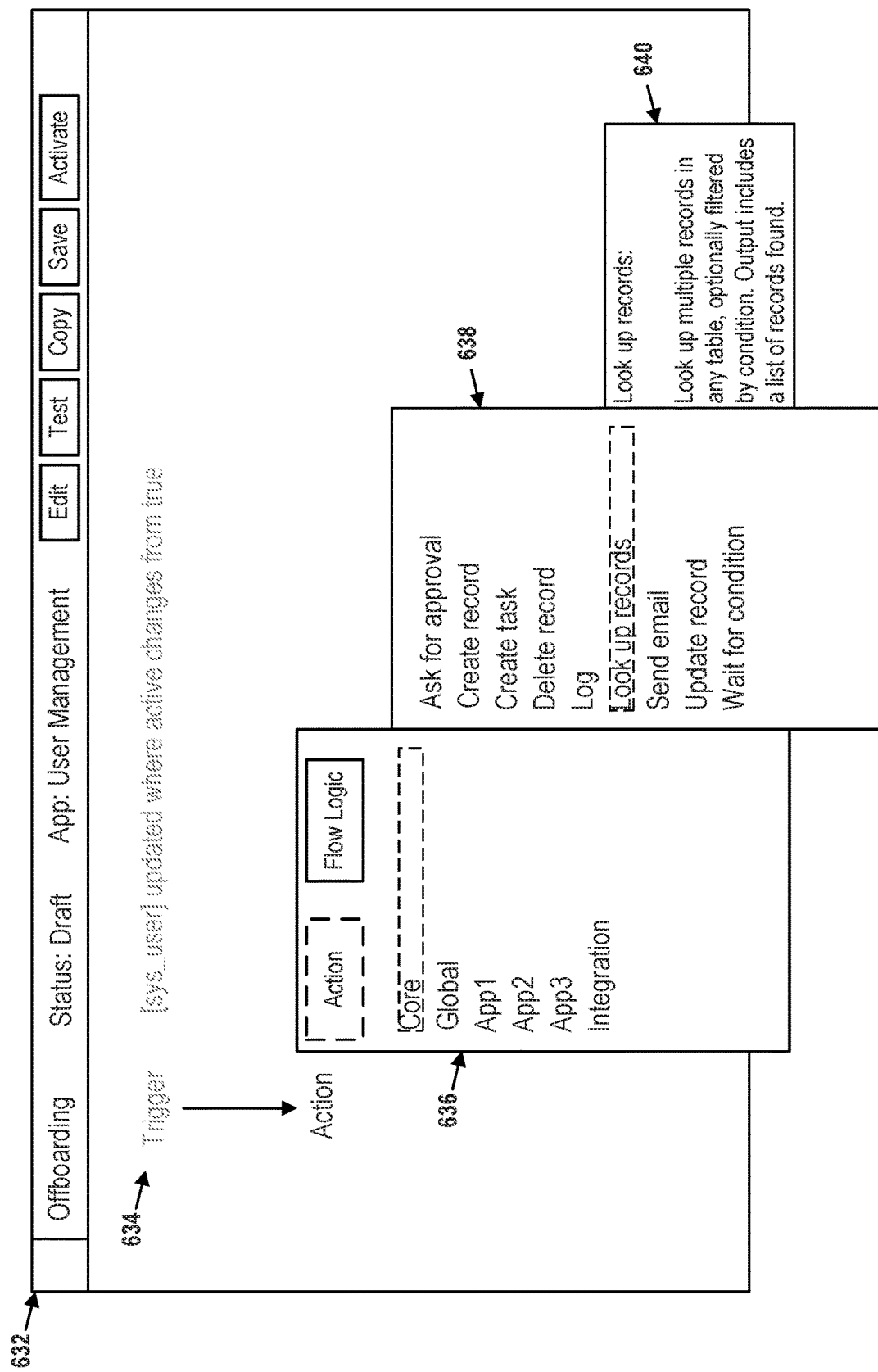

FIG. 6D depicts the first part of an action specification in GUI 632. Notably, at 634, the word "Trigger" is accompanied by a description of the trigger specified in FIGS. 6B and 6C. Further, this text is grayed in order to indicate that the trigger is no longer being specified.

As shown in menu 636, the user has the option of specifying an action or flow logic. The dashed line around the "Action" button indicates that an action is being specified. Particularly, menu 636 displays several contexts for the action being specified. For example, "Core" actions are supported by the computational instance as a default, while "Global" actions include all core actions, application-based, and integration-based actions. Application-based actions, "App1", "App2", and "App3", are actions supported by respective applications built on top of the remote network management platform. These may include, for example, various types of IT service management, IT operations management, customer service management, security operations, and CRM applications. Integration-based actions include actions defined by or supported by third-party applications integrated with the remote network management platform. These may include, for example, virtual chat applications, messaging applications, and so on. Each of these built-in or third-party applications may explicitly expose interfaces (referred to as "spokes") to the workflow design tool so that the workflow design tool can support workflows including data and/or functionality of these applications.

In FIG. 6D, the user has selected the "Core" context. Based on this selection, sub-menu 638 is displayed. This sub-menu provides the user the ability to select from a number of specific actions, such as "Ask for approval", "Create record", "Create task", "Delete record", "Log", "Look up records", "Send email", "Update record", and "Wait for condition". From these, the user has selected "Look up records". Accordingly, information box 640, that describes the selected action, may be displayed.

Figure 6E:
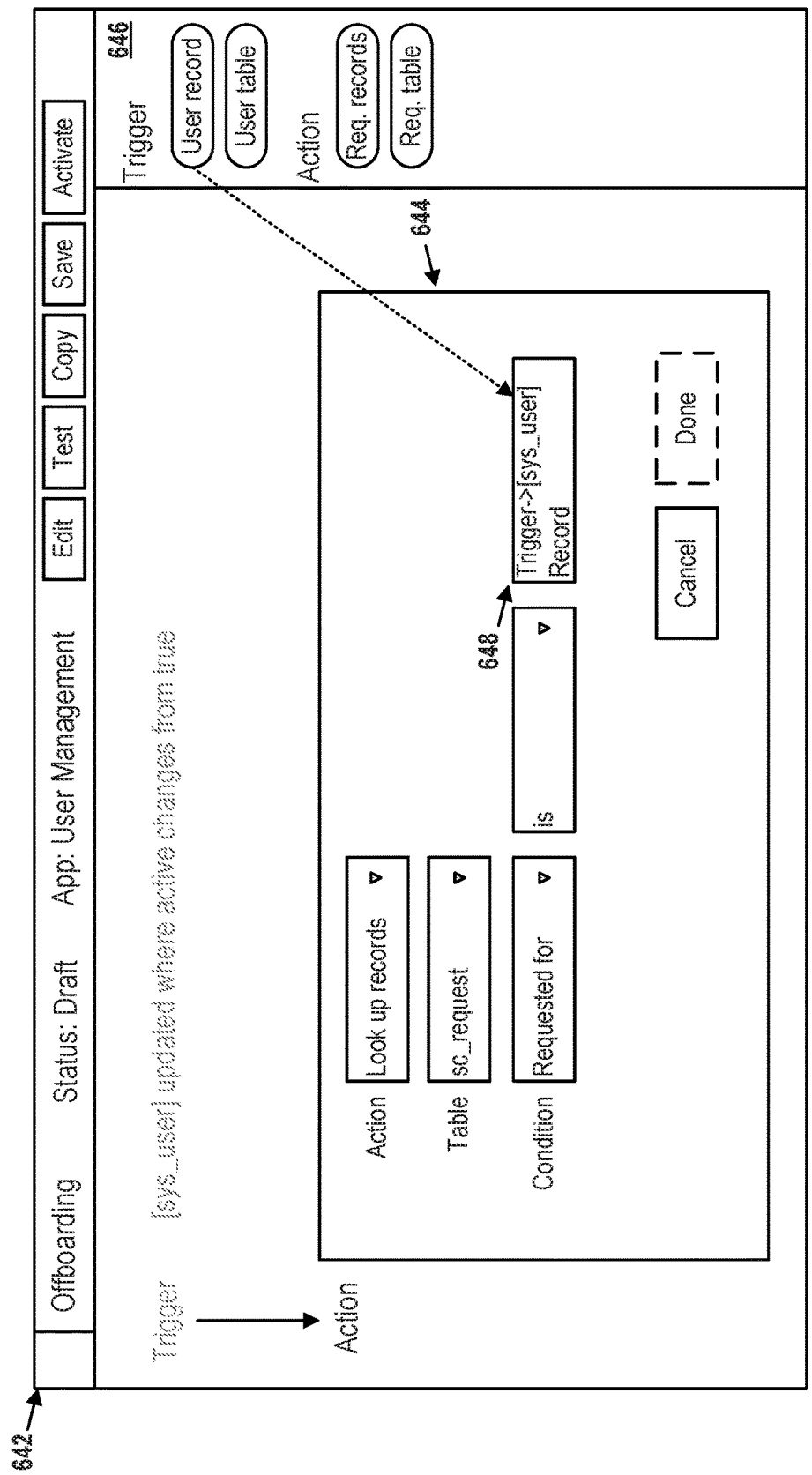

FIG. 6E depicts the second part of the action specification in GUI 642. Pop up window 644 (which, like window 606, may be a pane overlaid on top of GUI 642 and not a separate window), may allow specification of a table in which to look up records and the conditions that these records must meet. As shown in window 644, the action (as specified in FIG. 6D) is to look up records, and the table in which to perform this look up is sc_request (a table that contains catalog requests made by users). The records returned from sc_request are those where the "Requested for" field matches the user identified in the trigger step (i.e., a user whose active status has changed).

FIG. 6E also depicts column 646 containing pill-shaped user interface elements ("pills") arranged according to the previously-defined trigger as well as the action currently being defined. These pills are capable of being dragged from column 646 to the rightmost selectable item 648 in the condition field, as shown by the dotted arrow. User interface pills in this context are typically oval-shaped items that refer to data previously specified in the workflow and may be automatically placed in the user interface as this data is specified in the workflow design tool. In some embodiments, user interface chips or tags (with various shapes) may be used instead.

Notably, the two pills under the "Trigger" heading in column 646 refer to the user record(s) returned by the trigger (e.g., an entry in sys_user that changed from active to another state as specified in FIG. 6C) and the table upon which the trigger operates (e.g., sys_user as specified in FIG. 6C). The two pills under the "Action" heading in column 646 refer to the records found by the action being defined in FIG. 6E, as well as the table in which these records are located (e.g., sc_request).

The user interface elements, such as the pills in column 646, are a significant convenience for the user specifying the workflow, as they allow the user to easily include a reference to data or tables previously specified or referred to in the workflow. In this way, the user does not need to type in a specific reference to this information, and need only drag and drop a pill instead.

Once the user is satisfied with the information entered in window 644, the user may select or otherwise activate the "Done" button. This selection is denoted in FIG. 6E by this button being depicted with a dashed line. Once the user completes the dialog of window 644, the next phase of the workflow design tool, which allows the user to specify flow logic for the action, may be displayed.

Figure 6F:
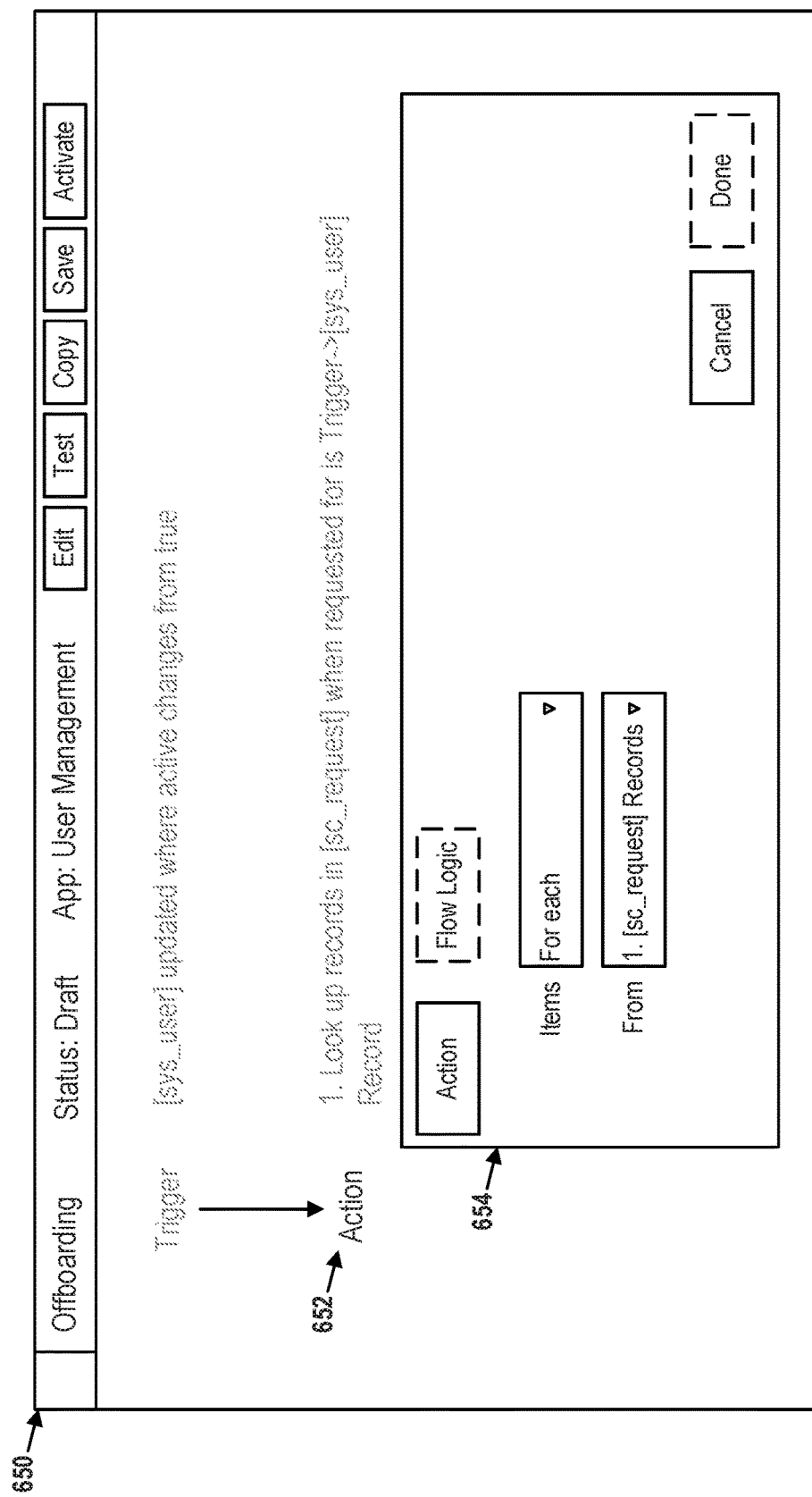

FIG. 6F depicts flow logic specification in GUI 650. Flow logic may be tied to an action, and specifies how the action is to be carried out. Notably, at 652 the word "Action" is annotated with a description of the action specified in FIGS. 6D and 6E.

Pop up window 654 may allow specification of whether the workflow operates on some or all items returned by the action specified in FIGS. 6D and 6E. The "Flow Logic" button is depicted with a dashed line to show that flow logic, rather than an action, is being specified. In this case, the selections made in window 654 indicate that the workflow operates on all items returned from the query specified in FIG. 6E. Notably, the "1. [sc_request] Records" value in the "From" field of window 654 indicates that the flow logic is to be applied to the output of Action 1, specified at 652. Notably, the value of the "From" field may be populated by a pill dragged and dropped from a column containing such pills. This column is not shown in FIG. 6F for purposes of simplicity, but may resemble column 646 of FIG. 6E.

Once the user is satisfied with the information entered in window 654, the user may select or otherwise activate the "Done" button. This selection is denoted in FIG. 6F by this button being depicted with a dashed line. Once the user completes the dialog of window 654, the next phase of the workflow design tool, which allows the user to specify a sub-action for the flow logic, may be displayed.

Figure 6G:
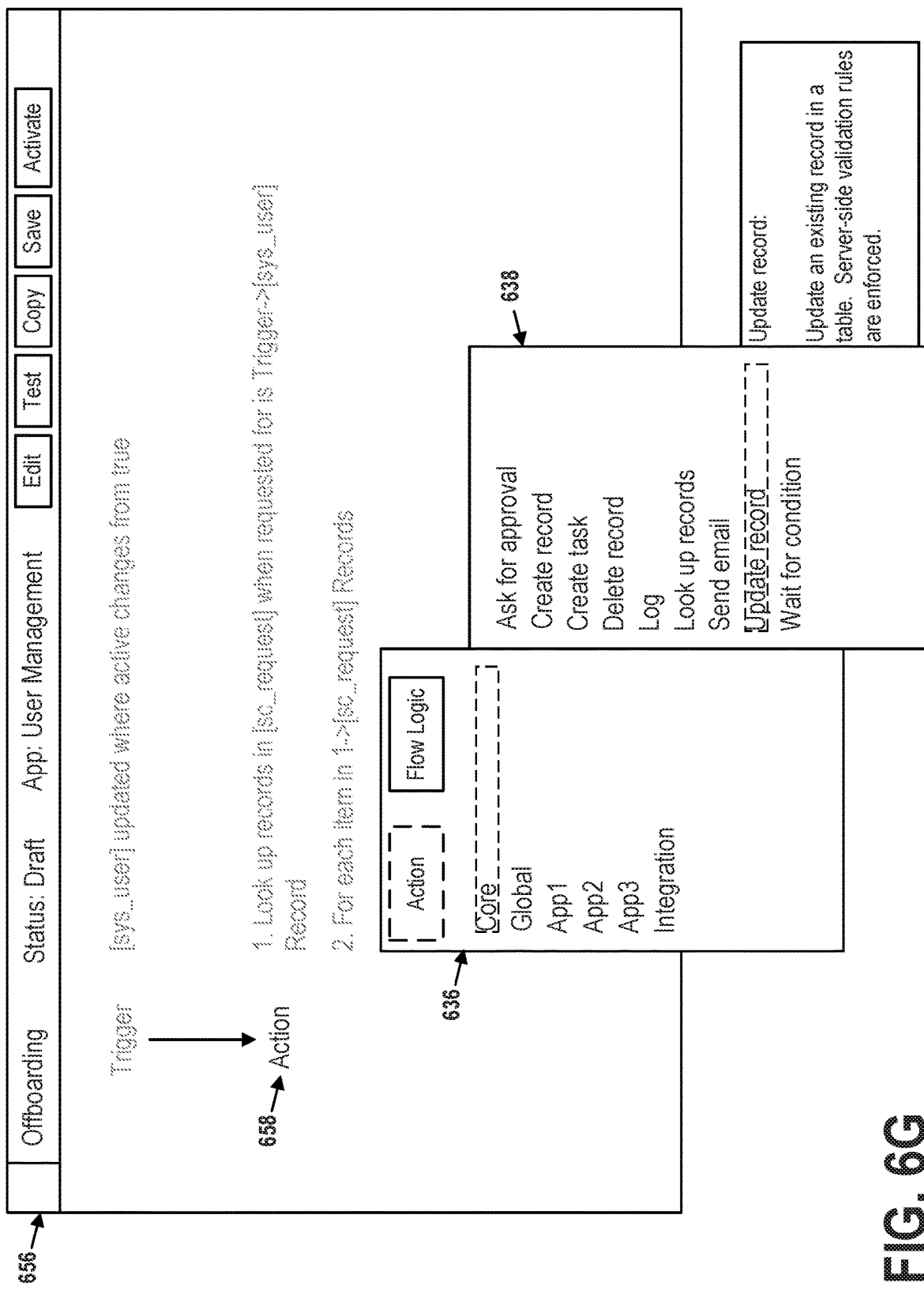

FIG. 6G depicts a sub-action specification in GUI 656. Notably, at 658, the word "Action" is accompanied by an updated description of the action and flow logic specified in FIGS. 6D, 6E, and 6F. Further, this text is grayed in order to indicate that the flow logic is no longer being specified. Notably, the sub-action specification once again displays menu 636 and sub-menu 638, this time with "Core" and "Update record" selected. Thus, GUI 656 depicts the user specifying that records will be updated for each item returned by the action defined in FIGS. 6D and 6E.

Figure 6H:
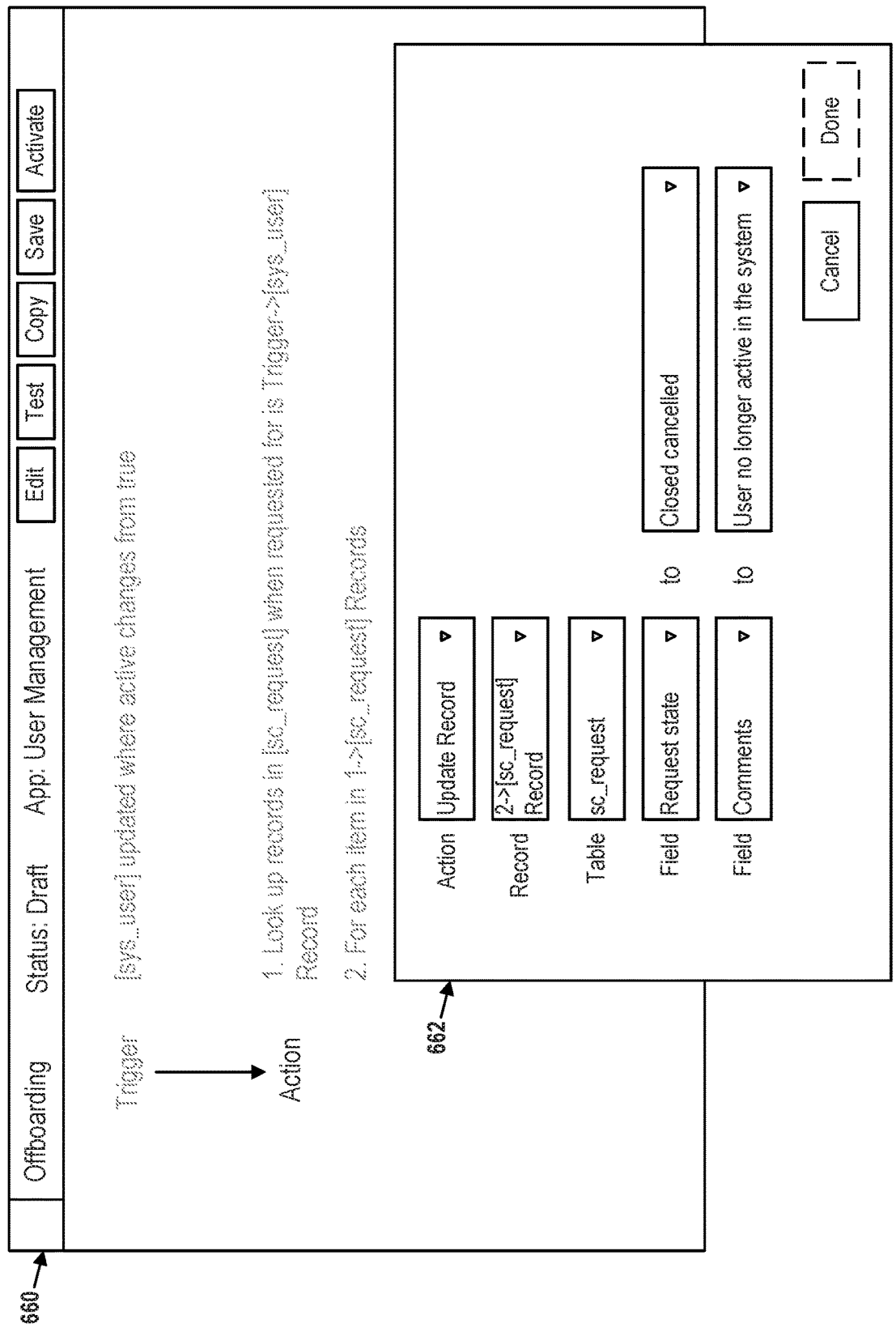

FIG. 6H continues this sub-action specification in GUI 660. Pop up window 662, may allow specification of actions to be taken on items returned by the flow logic specified in FIG. 6F. Particularly, the options shown in window 662 indicate that, for each record in the sys_user table that is returned by the trigger, any record in the sc_request table that was requested for the same user will be updated. The user also specifies two fields that are to be updated for matching records. The "Request state" field is to be updated to "Closed cancelled" to cancel the departed employee's pending catalog requests. The "Comments" field is also updated to "User no longer active in the system" to indicate why the request was cancelled.

Notably, the value of the "Record" field may be populated by a pill dragged and dropped from a column containing such pills. This column is not shown in FIG. 6H for purposes of simplicity, but may resemble column 646 of FIG. 6E.

Once the user is satisfied with the information entered in window 662, the user may select or otherwise activate the "Done" button. This selection is denoted in FIG. 6H by this button being depicted with a dashed line.

Figure 6I:
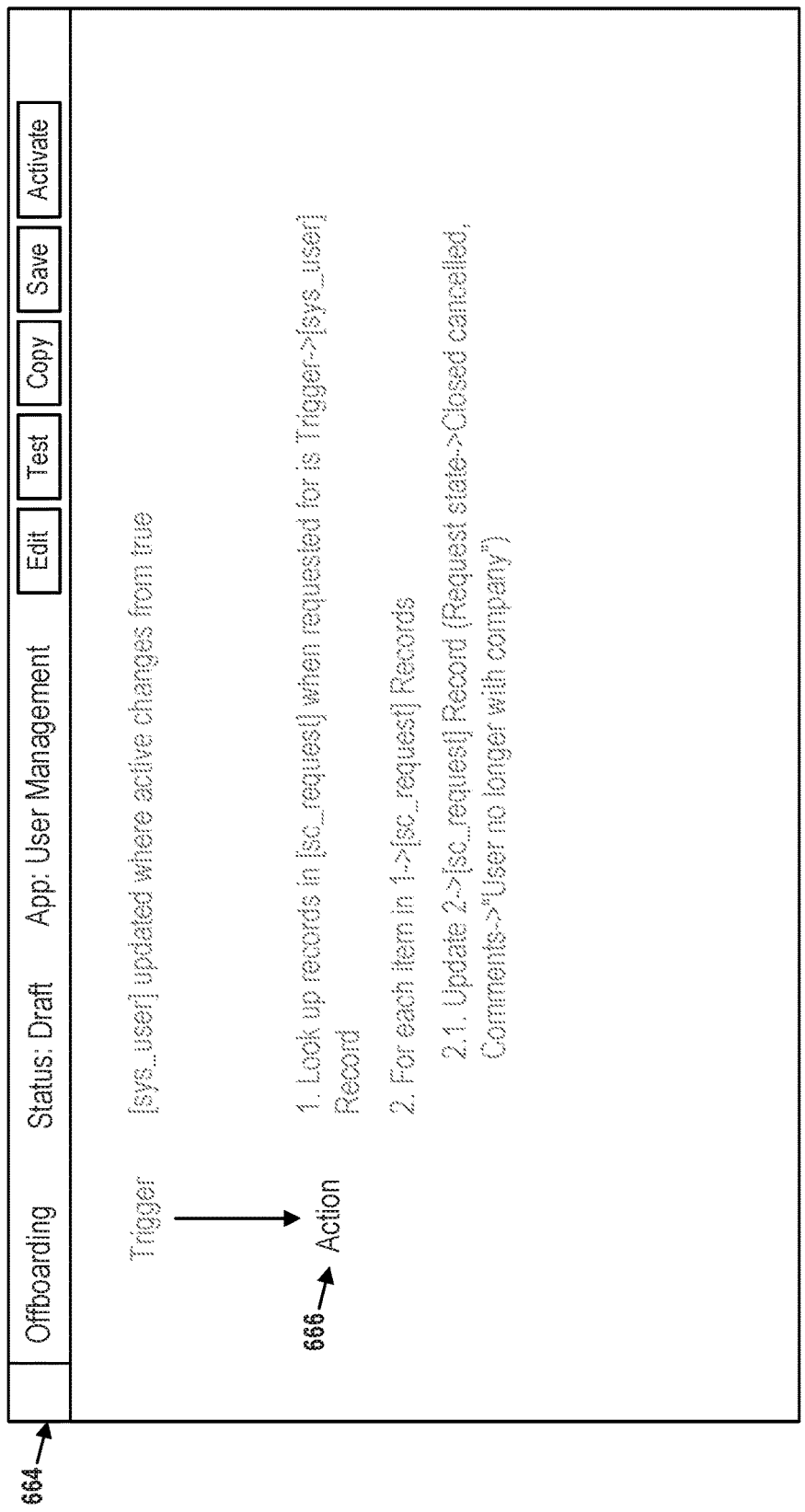

FIG. 6I shows GUI 664 depicting the workflow defined so far. At 666 the action specified in FIGS. 6D, 6E, 6F, 6G, and 6H is displayed. It is broken down into steps 1 (looking up records in the sc_request table that were requested for the employee identified by the trigger), 2 (for each these records, performing step/sub-action 2.1), and 2.1 (updating these records by closing them and adding an appropriate comment).

Figure 6J:
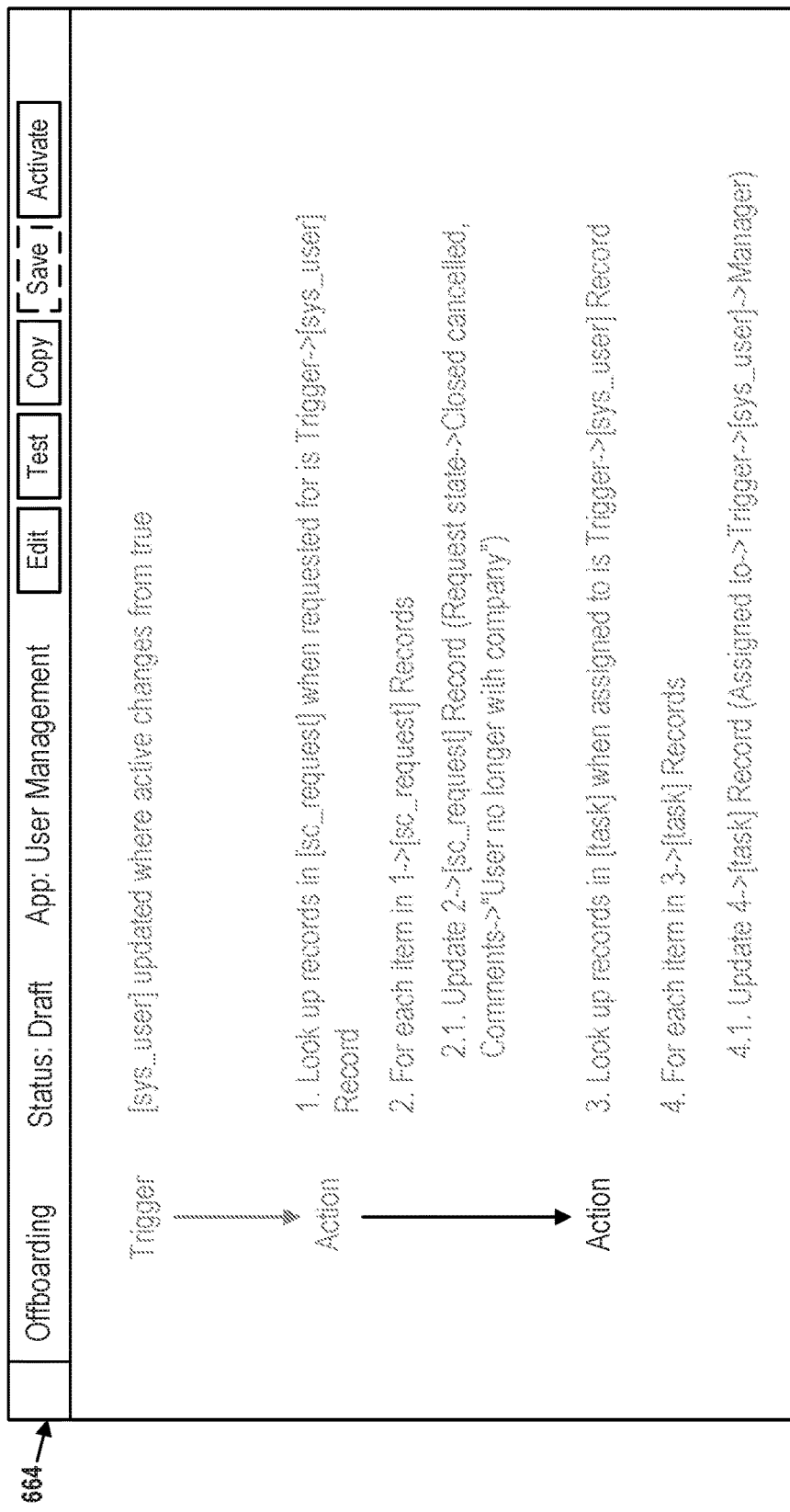

The rest of the desired workflow, as introduced above, also involves reassigning all tasks assigned to the departed employee to that person's manger. This further step is depicted in FIG. 6J. In order to avoid a degree of repetition, the GUIs for specifying the action, the flow logic, and the sub-action for task reassignment are omitted. Instead, FIG. 6J depicts GUI 664 updated to show the complete workflow.

Notably, step 3 looks up records in the task database table (which contains entries for tasks to be carried out by employees) that are assigned to the employee identified by the trigger. Step 4 specifies flow logic that, for each of these records, indicates that step/sub-action 4.1 is to be performed. Step 4.1 indicates that, for each record identified in step 4, the "Assigned to" field is to be changed to the manager of the identified employee.

In this way, arbitrarily complex flow-chart-like workflows can be rapidly designed in a data-centric fashion. The designer need not write any code, and is guided through the workflow specification by a series of GUIs that help the designer with appropriate menus and other interface elements. As a result, the designer saves a significant amount of time. In practice, experiments have shown that workflows can be specified in hours rather than the days typically needed for manually coding the workflows in a high-level programming language (e.g., JAVA®, JAVASCRIPT®, C++, and so on).

Another benefit of this workflow design tool is that it allows a workflow to be tested by the same GUI prior to deployment. FIG. 6K shows GUI 668, which contains the same information as GUI 660 from FIG. 6J, but also includes three columns reflecting the outcome of such a test. The "State" column indicates whether each step has been completed (in this example, all steps were completed), the "Start time" column indicates the time at which each step began, and the "Duration" column indicates how long each step took to be performed, in milliseconds. This allows the designer to verify that each step is properly performed, as well as to identify any steps that take an inordinate amount of time to complete. In alternative embodiments, other information may be displayed.

In the examples of FIGS. 6A-6K, a workflow is designed. The user persona that carries out such a process may be referred to as a workflow designer. However, actions may be designed in an analogous fashion (e.g., by way of similar GUIs) by a user with a persona of an action designer. Thus, an action designer may define custom actions that can be published, and published actions can be selected and incorporated into workflows by a workflow designer.

VI. GRAPHICALLY SPECIFYING A COMPLEX DATA OBJECT

Complex data objects are containers that represent compound data structures with elements of various data types. In some embodiments, these types may include primitive data types and compound data types. The former may be strings, integers, real numbers, Boolean values, dates, references (e.g., URLs) and so on. The latter may be objects and/or arrays. The objects may be capable of containing user-defined sets of member elements that have various primitive data types, compound data types, or both. The arrays may be capable of containing user-defined sets of member elements that all have one particular primitive data type or compound data type.

Workflows may ingest data from representational state transfer (REST) or simple object access protocol (SOAP) interfaces that is encoded as structured textual data (e.g., encoded in XML, JSON, or other formats). Workflows may also provide data to other applications or services that receive structured textual data. Thus, complex data objects can be integral to the operation of these workflows. For example, a complex data object may be used by an action (which may also be referred to as an "orchestration action" because it may involve multiple endpoints or services), and the action may, in turn, be added to a workflow.

Suppose that a workflow needs to be able to translate from XML data received in an XML schema from one application or service, to JSON data in a JSON schema to provide to another application or service. This translation may take place in an action that receives the XML data. In accordance with a mapping, fields of interest in the XML data may be stored as elements of a complex data object. Other fields may be ignored. Then, in accordance with another mapping, the JSON data may be generated from elements of the complex data object. Other possible workflow-based uses of a complex data object exist. These mappings may relate XML XPaths and/or JSON JPaths to specific elements of the complex data object.

As noted previously, it can be difficult and time consuming for users (especially non-technical users) to specify these mappings. Traditionally, doing so would involve writing program code to perform the translation. Not only would this take a great deal of time (e.g., days or weeks) to program and test just one action, but the code could vary from action to action.

The embodiments herein allow a user to specify, by way of an intuitive and flexible GUI, an action that receives data into a complex data object as input, and/or provides data from this complex data object as output. From this specification, a runtime engine will be able to automatically parse the incoming data and generate the outgoing data. Thus, the user can define interactions with complex data objects in a no-code fashion, carrying out these tasks in minutes or hours instead of days or weeks. Further, the details of XPaths and JPaths can be hidden via a flexible GUI so the user does not require advanced programming experience to map structured data to a complex data object or vice versa.

Figure 7A:
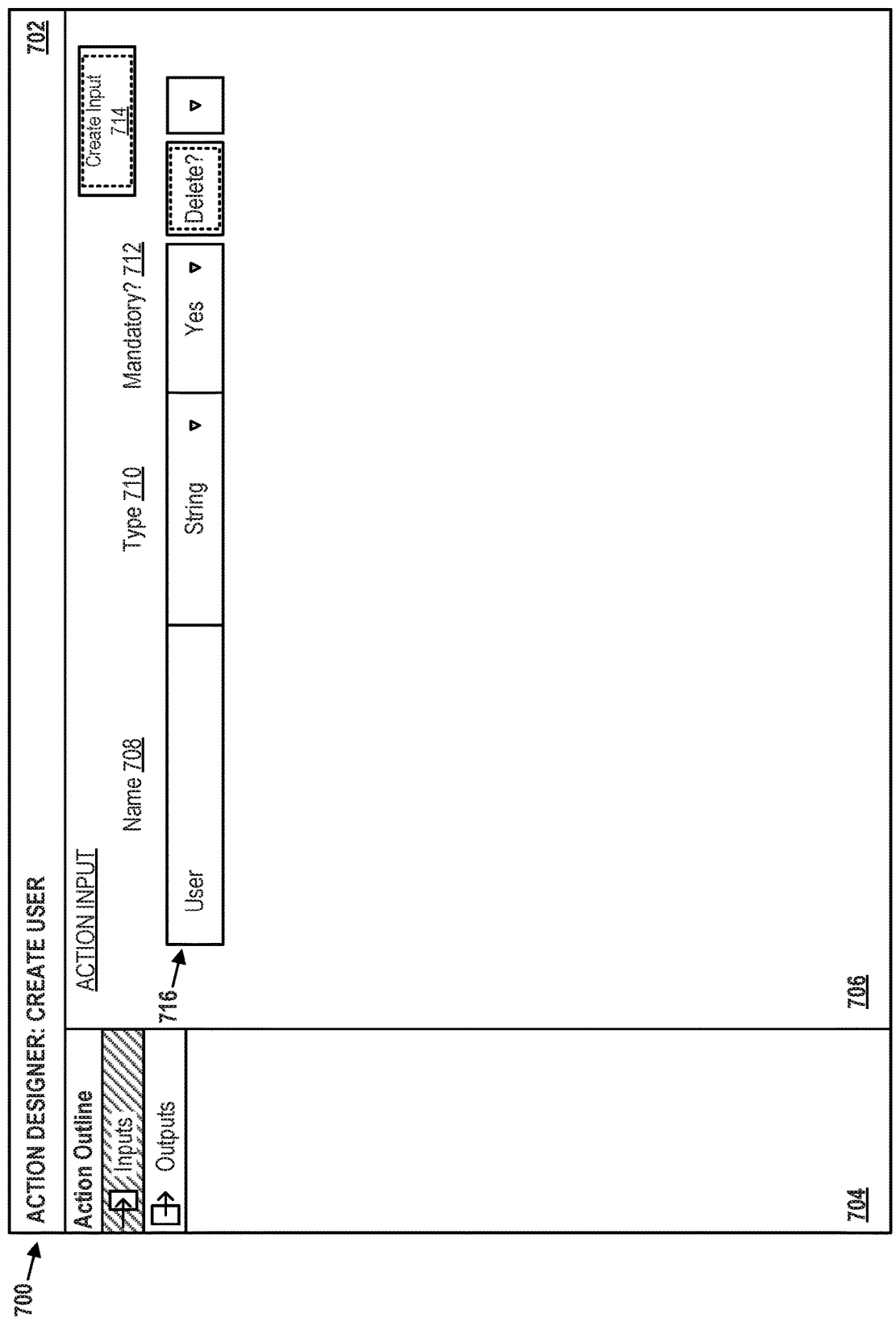
FIGS. 7A, 7B, 7C, 7D, and 7E depict action design tool graphical user interfaces that allow interactive definition of a complex data object, in accordance with example embodiments.

To that point, FIG. 7A depicts an action design GUI 700. GUI 700 contains title panel 702, action outline panel 704, and main panel 706. Title panel 702 indicates that GUI 700 is part of an action designer application, and that the current action being designed is related to creating a user record. Action outline panel 704 provides a list of steps involving the design of the complex data object. In this case, only two steps are defined: inputs and outputs. Of these, the inputs step is emphasized, which indicates that a complex data object for ingesting data is being defined in main panel 706. When the user moves on to define the output of the action, the outputs step may be emphasized and the inputs step de-emphasized.

Main panel 706 contains a definition of a complex data object as a work-in-progress, currently consisting of just one element, element 716. Main panel 706 also contains a set of columns for specifying and editing the elements of the complex data object. Name column 708 indicates the name of each element, type column 710 indicates the element's type, and mandatory column 712 indicates whether the presence of the element is required in the complex data object.

In the embodiment shown, three main types of element are supported: object, array, and primitive data types. Elements of the type object are essentially complex data objects themselves—compound data structures of one or more sub-elements. Elements of the type array contain one or more elements of the same type therein. In the embodiments shown, each array may be defined to contain elements of only a particular data structure or primitive data type. These primitive data types may include Boolean types, date types, string types, integer types, real number types, object types, and so on.

The use of objects and arrays allows the complex data object to be recursively defined. Thus, objects can contain arrays, other objects, and primitive data types, while arrays can contain other arrays, objects, or primitive data types. The entire complex data object itself may be thought of as an object. The nesting of objects and arrays may be arbitrarily deep. Further, the elements of the object may be dot-walked for convenience. Dot-walking refers to an element by building a chain of element names separated by dots (periods). Dot-walking can be used in forms, lists, scripts, for example, to access particular elements.

As noted above, type column 710 shows the type of each element. Selecting or otherwise activating the drop-down arrow at the right of each entry in type column 710 may cause a drop-down menu to appear. This menu may list each data type so that the types of elements can be modified. Similarly, selecting or otherwise activating the drop-down arrow at the right of each entry in mandatory column 712 may cause another drop-down menu to appear, this one allowing the options "yes" and "no" to be chosen.

As shown in FIG. 7A, each element may also be associated with a "delete" button that, when selected or otherwise activated, causes the element to be removed from the complex data object. Also, a further drop-down arrow at the right of the "delete" button may allow other associations to be made with the element, such as transformations to be applied to the element and so on.

Element 716 may have been placed on main panel 706 by default. Notably, element 716 has been edited to be named "User", and of the data type string. Element 716 may be considered to be the root element of the complex data object, as other elements in the complex data object would be contained within element 716. To that point, the user may wish to change the type of element 716 to either an object or an array.

Figure 7B:
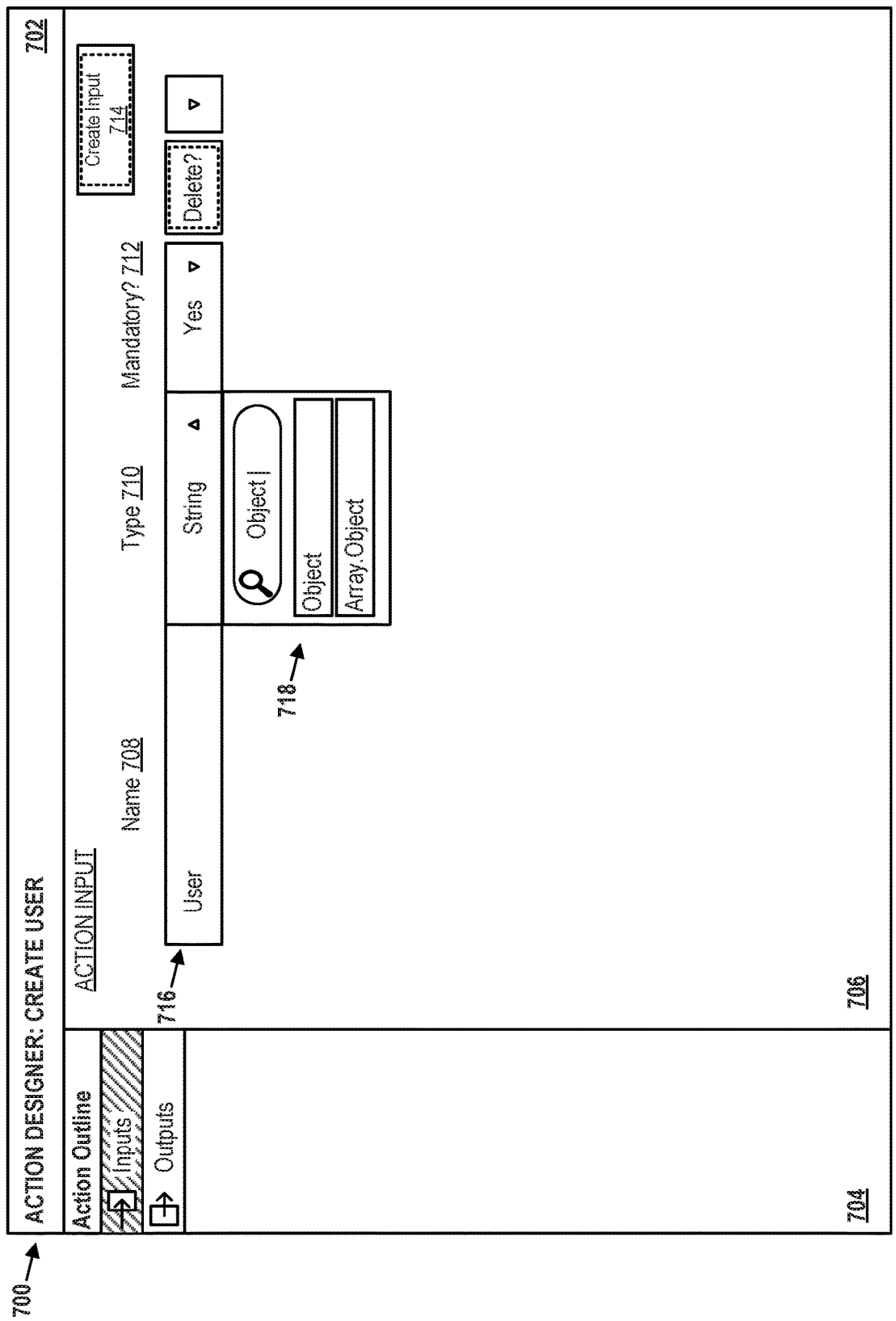

FIG. 7B depicts such a process. The user has selected or otherwise activated the drop-down arrow for the type field of element 716. In response, drop-down menu 718 has been displayed. Drop-down menu 718 contains a search field in which the user can enter text. In this example, the user has entered the search term "Object". Thus, drop-down menu 718 includes selectors for options that contain this search term ("Object" and "Array.Object", the former being a single object and the latter being an array of objects). If the user had not entered the search term, all possible options may be displayed.

Figure 7C:
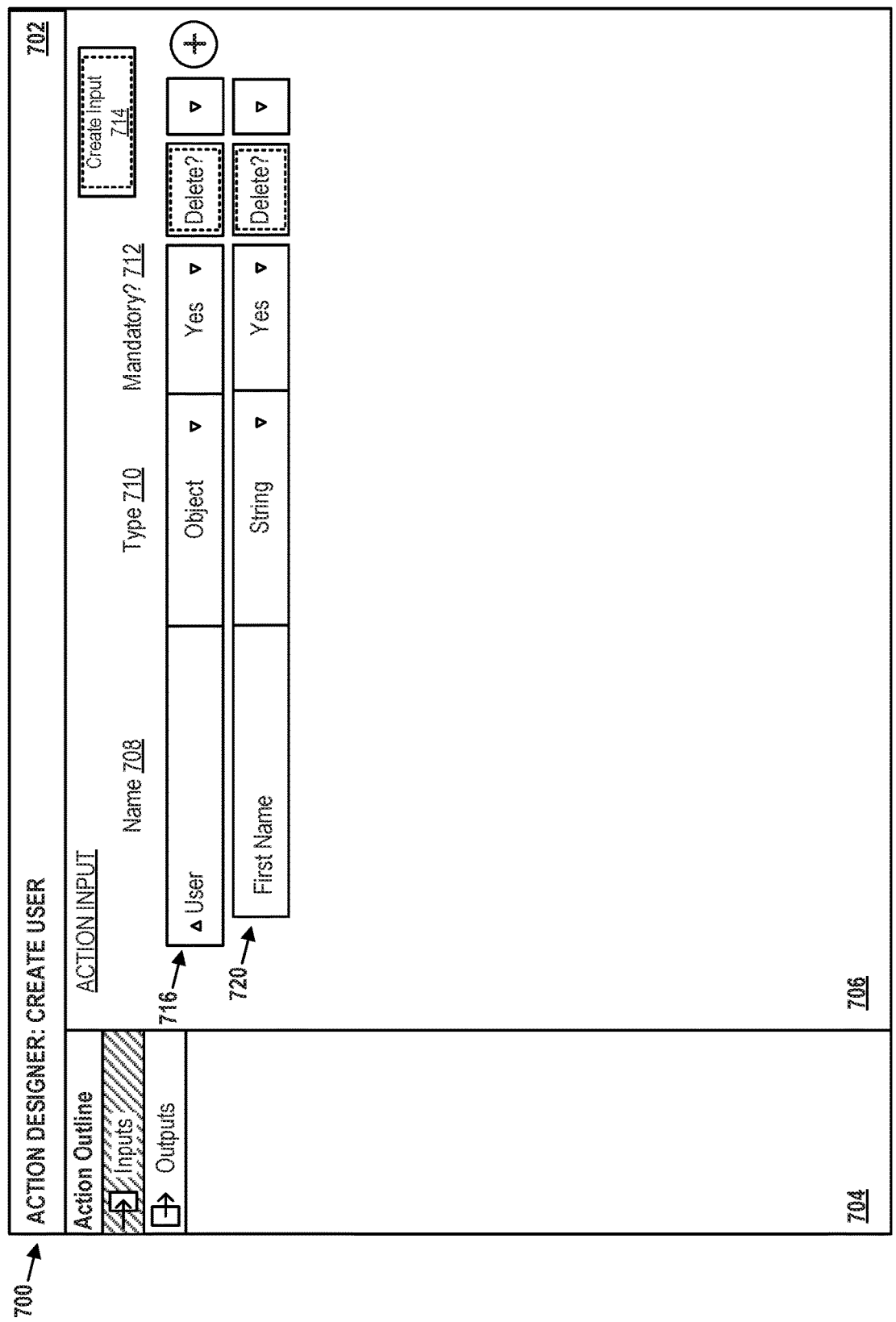

FIG. 7C depicts GUI 700 after the type of element 716 has been changed to object. In response, a drop-down arrow is placed to the left end of its name field and a plus button may appear to the far right of element 716. Alternatively, the plus button may have previously been grayed out or otherwise inactive and then activated by element 716 changing type from string to object.

The drop-down arrow may make element 716 collapsible. When toggled, all of the child elements of element 716 may be collapsed into element 716 and thus hidden from view. When toggled again, these child elements may be displayed. Similar drop-down arrows may have similar functions for other elements that represent objects.

The plus button, when selected or otherwise activated, allows child elements to be added to element 716. For instance, selecting or otherwise activating the plus button once adds one child element, selecting or otherwise activating the plus button twice adds two child elements, and so on.

To that end, main panel 706 also contains element 720 which may have been added as a result of such selection or activation of the plus button. Element 720 has been edited to have a name of "First Name" and a type of string. Also, it is shown indented relative to element 716, indicating that it is a child of element 716. In other words, element 720 is a component of the object defined by element 716.

Figure 7D:
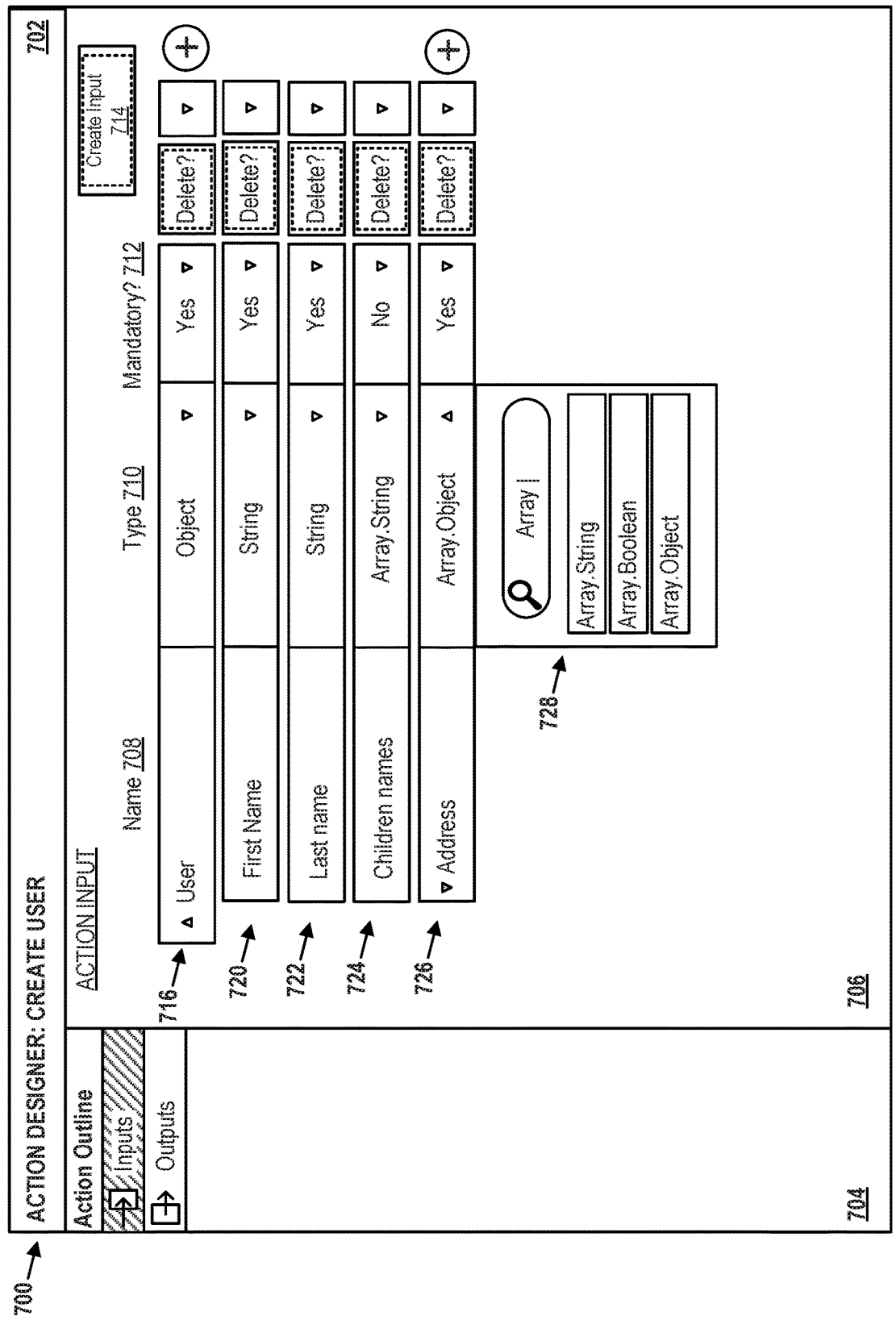

FIG. 7D depicts GUI 700 after several more elements have been added to the complex data object. In particular, element 722 has a name of "Last Name" and is a string, element 724 has a name of "Children names" and is an array of strings (e.g., one string per child's name), and element 726 has a name of "Address" and is an array of objects. Notably, element 724 is not mandatory. Also, element 726 behaves as an object even though it is an array of objects. Thus, child elements can be added to element 726, but not to arrays of primitive data types such as arrays of strings or integers.

FIG. 7D also shows that the user has selected or otherwise activated the drop-down arrow for the type field of element 726. In response, drop-down menu 728 has been displayed. Drop-down menu 728 contains a search field in which the user can enter text. In this example, the user has entered the search term "Array". Thus, drop-down menu 728 includes selectors for options that contain this search term ("Array-.String", "Array.Boolean" and "Array.Object", the first being an array of strings, the second being an array of Boolean values, and the third being an array of objects). Other possible types of array exist. If the user had not entered the search term, all possible options may be displayed.

Element 726 shows that the Array.Object type has been selected. Thus, a drop-down arrow is placed to the left end of the name field of element 726, and a plus button is placed to the far right of element 726. Alternatively, the plus button may have previously been grayed out or otherwise inactive and then activated by element 726 changing its type from string to an array of objects.

The drop-down arrow may make element 726 collapsible. When toggled, all of the child elements of element 726 may be collapsed into element 726 and thus hidden from view. When toggled again, these child elements may be displayed.

The plus button, when selected or otherwise activated, allows child elements to be added to element 726. For instance, selecting or otherwise activating the plus button once adds one child element, selecting or otherwise activating the plus button twice adds two child elements, and so on.

Figure 7E:
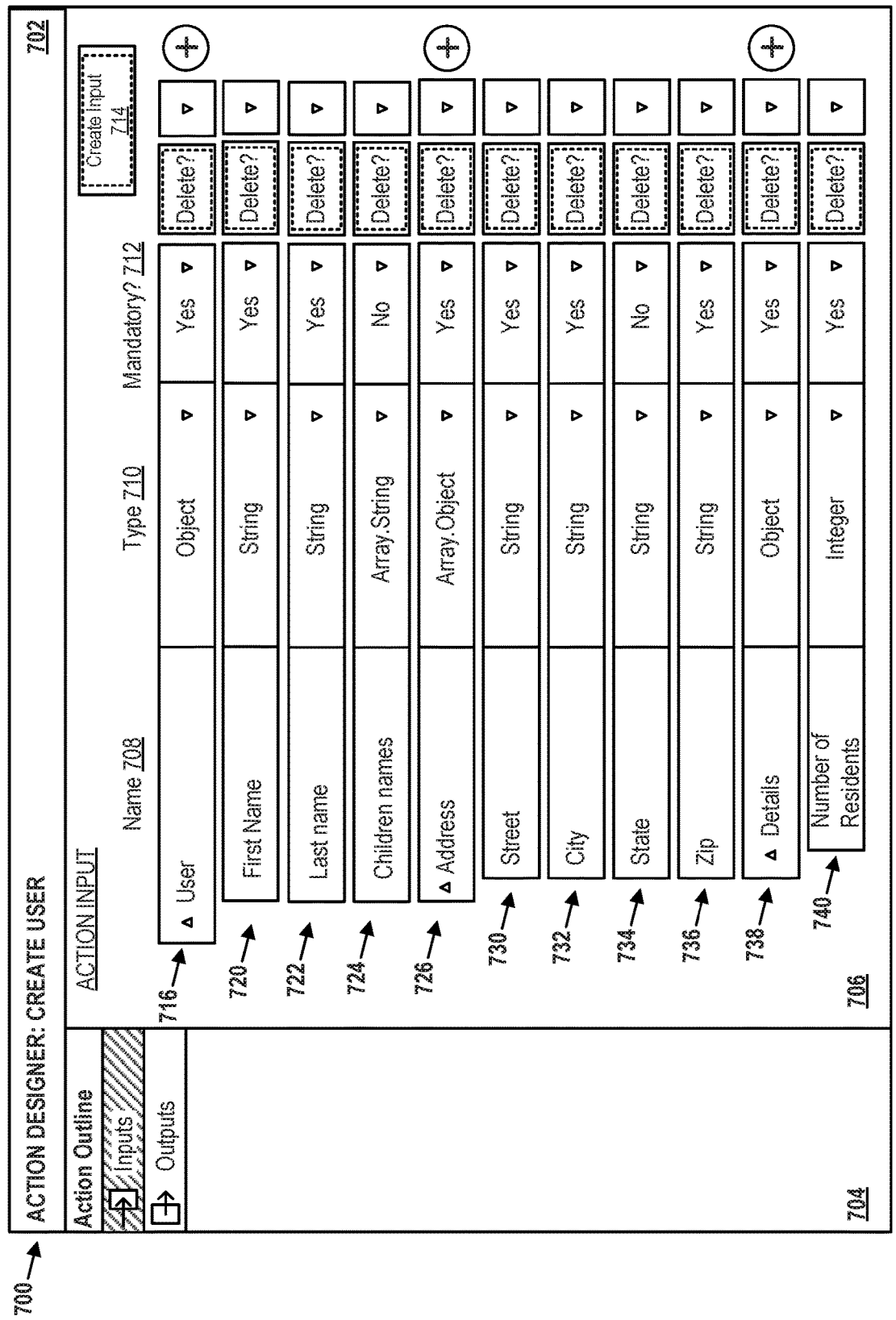

FIG. 7E depicts GUI 700 with yet more elements added to the complex data object. Notably, these include elements 730, 732, 734, 736, and 738, which are children of the "Address" element 726, and are indented accordingly. Element 738 is an object that contains element 740 as its child, where element 740 is also indented accordingly. In various embodiments, more elements may be children of element 738.

FIGS. 7A-7E depict just one possible example of a complex data object. Other complex data objects can be defined in a similar fashion with an arbitrary number of elements that are nested in any fashion.

GUI 700, in its various examples, can be used by a non-technical user (or a technical user for that matter) to define any complex data object. The visual layout of GUI 700 facilitates doing so, by displaying elements in a hierarchical fashion, along with their names, types, and whether they are mandatory. Further, the drop-down arrows and plus buttons associated with each object and array of objects provide a simple method for collapsing and expanding these elements, as well as adding new child elements thereto. In some embodiments, the elements may be dragged about the representation of the complex data object and dropped in locations so that the ordering of the elements and/or the hierarchy of the elements is changed.

When the user has completed defining the complex data object, he or she may select or otherwise activate create input button 714. This may cause a representation of the complex data object to be written to persistent storage (e.g., a database). GUI 700 may also present options to the user for saving the complex data object as a template from which further complex data objects can be derived without having to specify each and every element thereof.

As discussed, GUI 700 facilitates the definition of a complex data object as an input or an output to an action. Selecting or otherwise activating create input button 714 may result in the defined complex data object being associated with the action's input. As a result, action outline panel 704 may de-emphasize the input step and emphasize the output step, and the user may be prompted to define a complex data object for the action's output. This additional complex data object can be defined in a similar fashion as shown in FIGS. 7A-7E, and thus the GUI for doing so is not explicitly shown herein. The input and output of the action may be associated with the same or different complex data objects.

The action may also have further intermediate processing steps that are not shown herein. These steps may compare the action's input (as represented by a complex data object) to various thresholds or values, transform this input in various ways, and/or perform other operations based on this input, such as changing values in a database or transmitting an email.

Regardless of these details, the defined action may be integrated into a workflow as described above and shown in the context of FIG. 6D, for example. An action that receives XML or JSON data into a complex data structure may cause the underlying software to automatically generate a parser to carry out the mapping from XML or JSON fields to complex data object elements. The parser would be considered part of the action, and invoked when activated by any workflow that contains the action.

VII. USE OF A COMPLEX DATA OBJECT IN A WORKFLOW

Figure 8A:
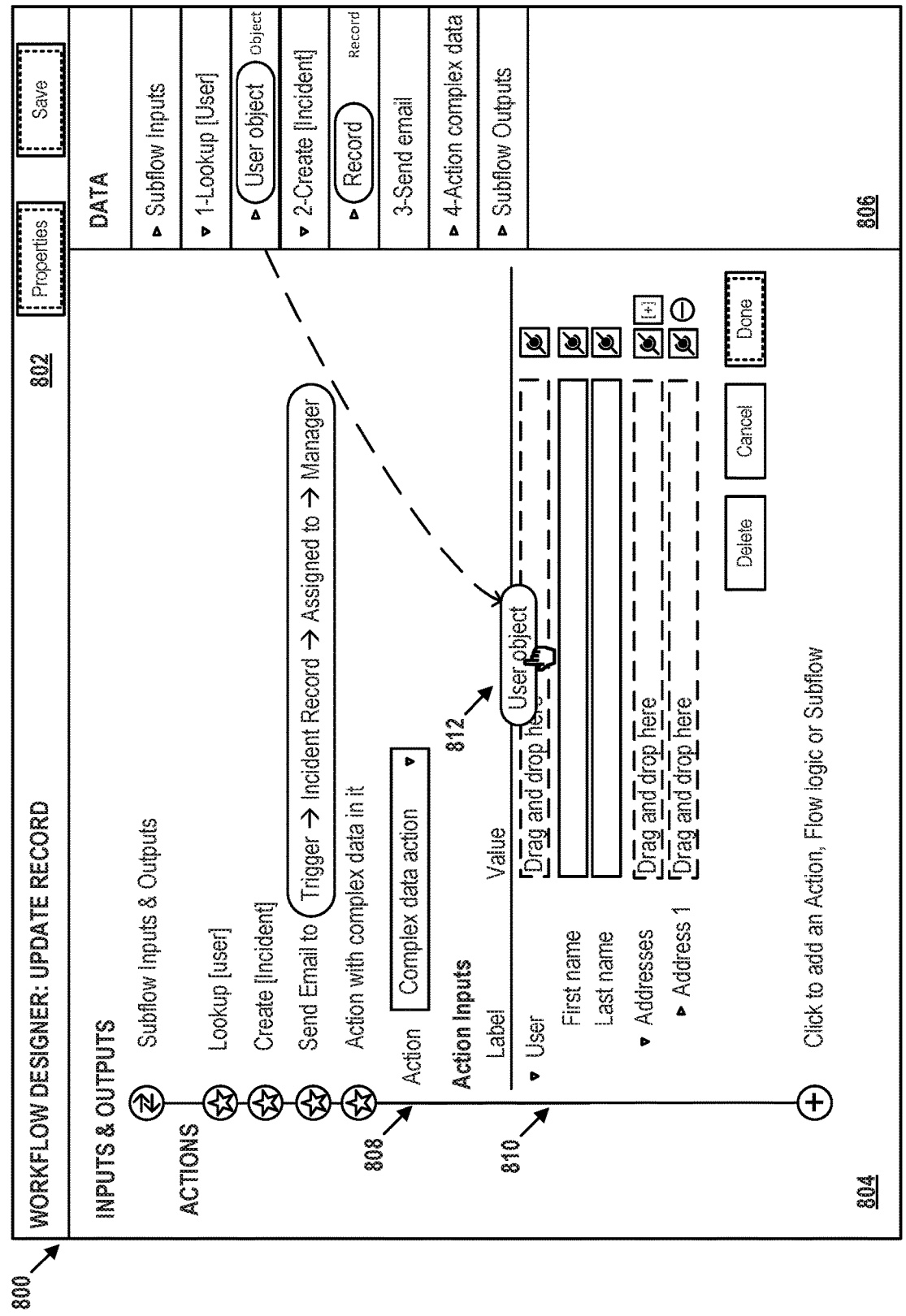
FIGS. 8A, 8B, 8C, and 8D depict workflow design tool graphical user interfaces that incorporate actions into workflows that populate complex data objects, in accordance with example embodiments.

FIG. 8A depicts GUI 800, which involves integrating an action with complex data object input into a workflow. GUI 800 is similar to those shown in FIGS. 6D-6J, but focuses on a workflow with multiple actions in which data structure output from a previous action is used as input to a later action as a complex data object.

Notably, GUI 800 contains title panel 802, workflow panel 804, and data panel 806. Other panels and/or other arrangements of panels may be used in GUI 800. Title panel 802 indicates that GUI 800 is part of a workflow designer application, and that the current workflow being designed is related to updating a record.

Workflow panel 804 depicts a workflow that includes a series of actions to be performed (e.g., by a computational instance on behalf of a managed network). At a high level, these actions include looking up a user (e.g., an employee of an enterprise), creating an incident related to that user (e.g., an IT trouble ticket), sending an email notification of the incident to the manager of the agent to whom the incident is assigned, and then carrying out the action as specified (i.e., the action defined in the context of FIGS. 7A-7E). These actions may be displayed by workflow panel 804 as categorically organized GUI elements, indicative of the corresponding actions and header categories thereof.

Data panel 806 includes a list of data items associated with various parts of the workflow. These data items are represented as user interface pills, and may include the user's information, and the incident record. These pills can be dragged onto action input fields in workflow panel 804.

Notably, action 808 includes action inputs 810. This may be a representation of the complex data object of the action input defined in FIGS. 7A-7E. The user may drag pill 812

(or a nested element therein) from data panel 806 to action inputs 810. This links the input of action 808 to an object representing the user that an earlier action returned as output.

Figure 8B:
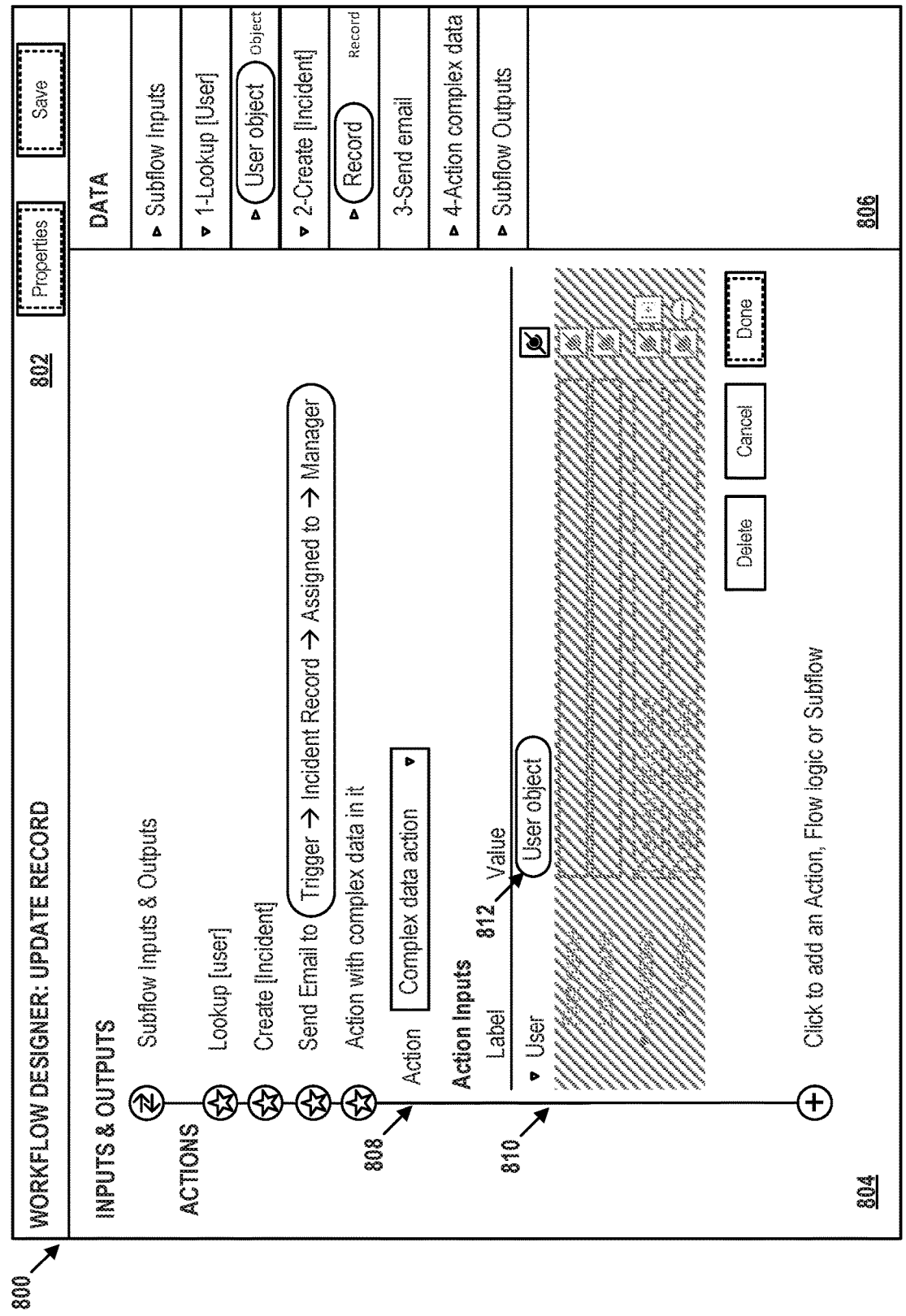

To that point, FIG. 8B depicts GUI 800 once pill 812 has been placed on action inputs 810. Pill 812 is shown with normal emphasis while the rest of action inputs 810 is grayed out. This indicates to the user that pill 812 represents all of action inputs 810, and that the user need not fill in any of the other elements therein.

Once the user is satisfied with the workflow defined on GUI 800, he or she may select or otherwise activate the "Done" button at the lower right part of workflow panel 804. Doing so saves the workflow to memory so that it can be executed as needed at a later time.

Advantageously, this allows the user to easily populate a complex data object based on a data structure defined by another action or in another part of a workflow. Doing so eliminates the need for the user to write code to parse, for example, XML or JSON data in order to place this data properly into the complex data object.

Figure 8C:
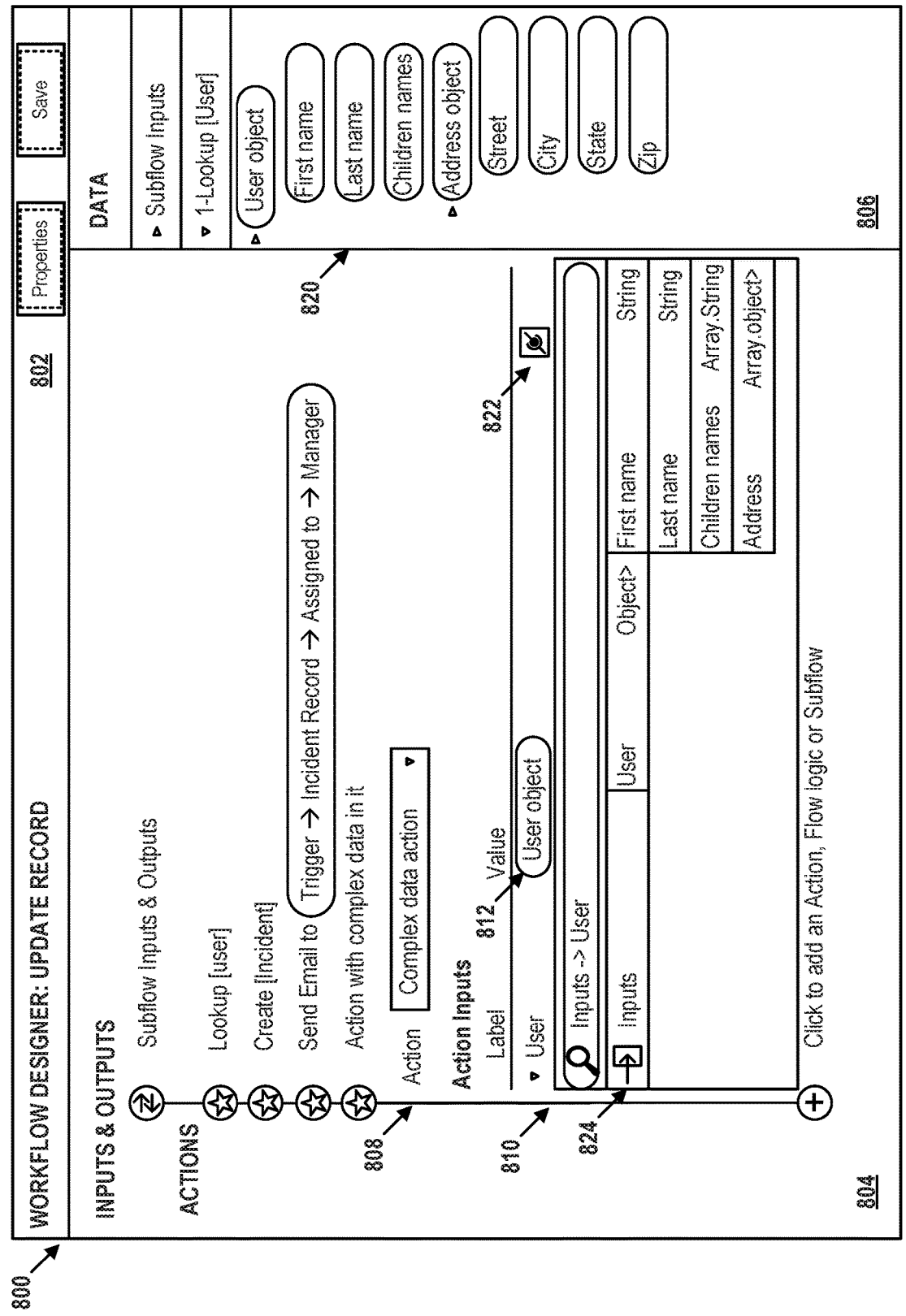

FIG. 8C depicts a further embodiment of GUI 800. In this case, pill 812 has been placed in action inputs 810 as shown in FIG. 8B. But data panel 806 also shows this pill being expanded to display the complex data object that it represents as well as its constituent elements in item 820. Notably, each object or array of objects in the complex data object can be collapsed or expanded by selecting or otherwise activating an associated side-arrow. For purposes of simplicity, FIG. 8C does not display all elements of the user object defined in FIG. 7A-7E. Regardless, when expanded, each element of this complex data object is also represented as a pill that can be individually dragged and dropped into various parts of the workflow being defined.

FIG. 8C also depicts the structure and individual elements of the complex data objects being displayed as part of action inputs 810. Notably, the user may select or otherwise activate button 822 to expand the object of pill 812 into representation 824. The latter is a searchable hierarchy of elements of a complex data object associated with the action being defined. Notably, representation 824 indicates that the user object is used for input to the action and lists some of the elements of its top-level object ("User").

Additionally, working with a complex data object often requires programming experience to access a nested element, or iterate over a list of elements. By representing a complex data object as a navigable structure in the GUI, the need to understand programming and/or parsing of JSON, XML, XPath, JPath or the like is eliminated by introducing a usable visual representation. For example, taking a child element that is an array, then breaking it up into individual objects or elements that can then be used graphically is a very powerful feature that is supported by the embodiments herein.

Figure 8D:
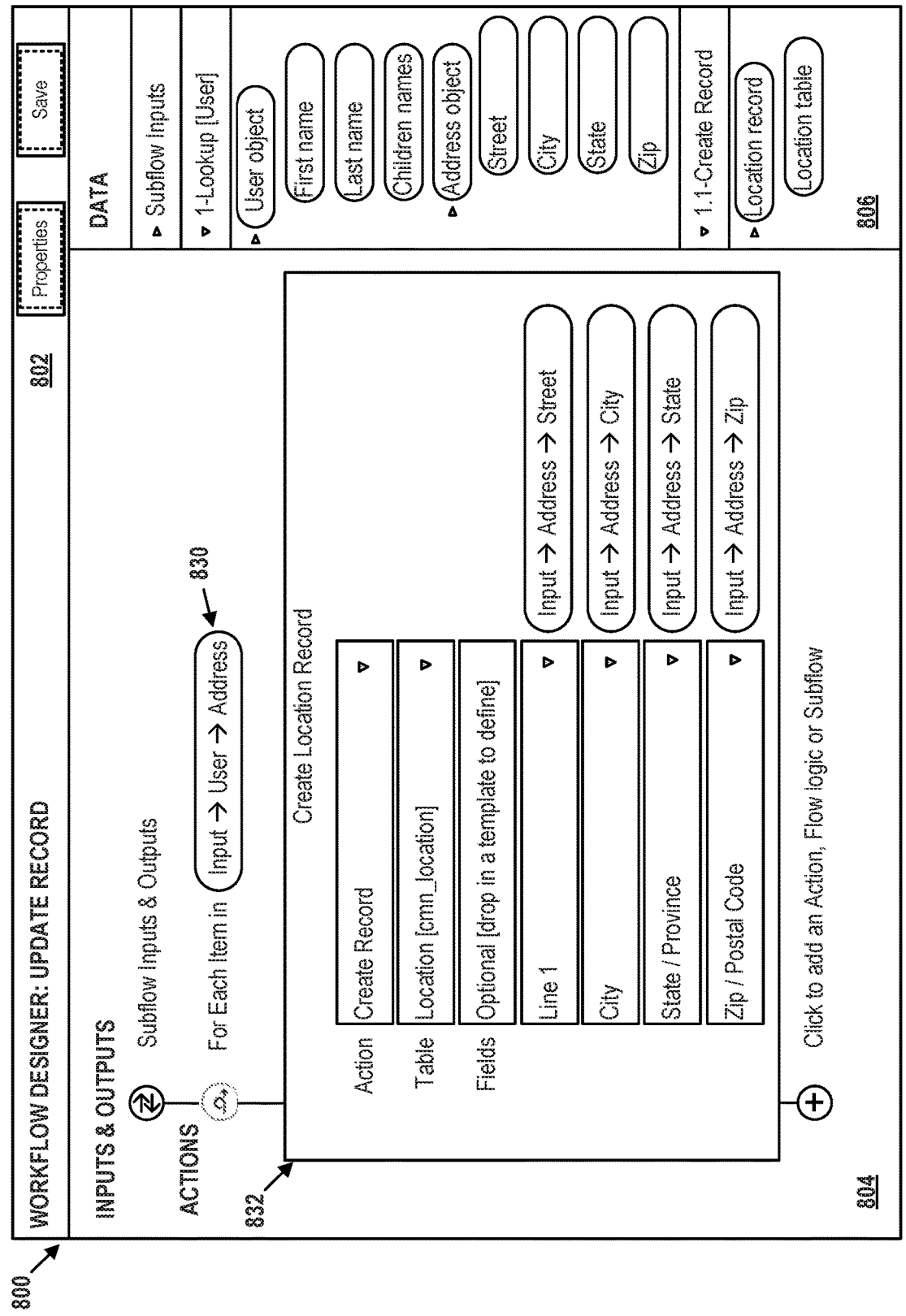

FIG. 8D depicts such an embodiment. In this figure, GUI 800 is being used to define a different workflow—one that involves iterating over an array of address objects (e.g., nested elements from the complex data object defined in FIGS. 7A-7E), and placing each address therein in a database record.

Particularly, action 830 specifies that a "for each" loop is to be executed over the address objects of the complex data object, as shown in data panel 806. Pop-up window 832 results from this specification, and allows the user to further specify that the action will create a record, the table in which the record is to be created, and the mapping of the address objects to the fields of the table. Particularly, the "Street" element of the address object is mapped to the "Line 1" field of the table, the "City" element of the address object is mapped to the "City" field of the table, the "State" element of the address object is mapped to the "State/Province" field of the table, and the "Zip" element of the address object is mapped to the "Zip/Postal Code" field of the table.

VIII. EXAMPLE OPERATIONS

Figure 9:
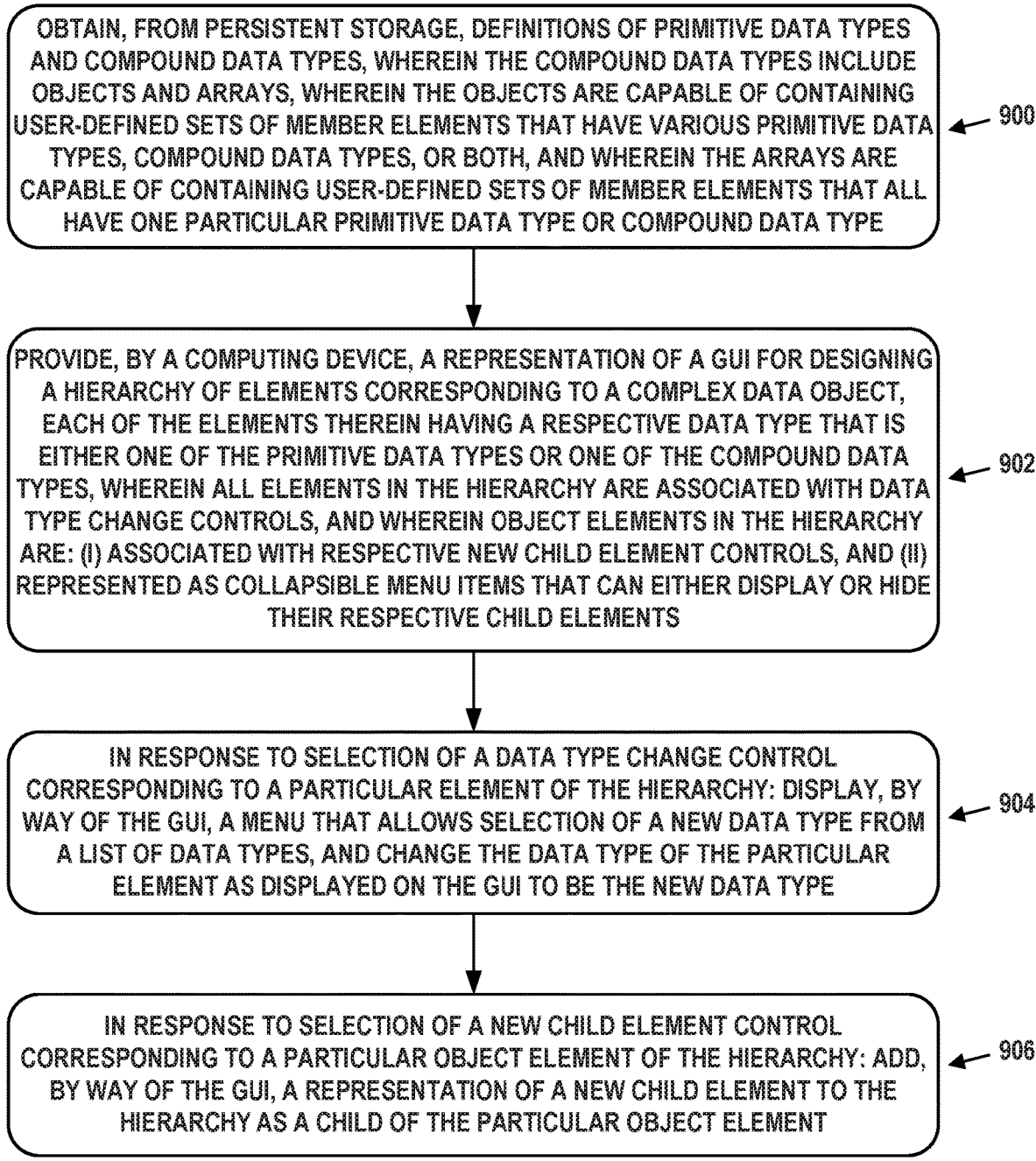
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve obtaining, from persistent storage, definitions of primitive data types and compound data types, where the compound data types include objects and arrays, where the objects are capable of containing user-defined sets of member elements that have various primitive data types, compound data types, or both, and where the arrays are capable of containing user-defined sets of member elements that all have one particular primitive data type or compound data type.

Block 902 may involve providing, by a computing device, a representation of a GUI for designing a hierarchy of elements corresponding to a complex data object, each of the elements therein having a respective data type that is either one of the primitive data types or one of the compound data types, where all elements in the hierarchy are associated with data type change controls, and where object elements in the hierarchy are: (i) associated with respective new child element controls, and (ii) represented as collapsible menu items that can either display or hide their respective child elements.

Block 904 may involve, possibly in response to selection of a data type change control corresponding to a particular element of the hierarchy: displaying, by way of the GUI, a menu that allows selection of a new data type from a list of data types, and changing the data type of the particular element as displayed on the GUI to be the new data type.

Block 906 may involve, possibly in response to selection of a new child element control corresponding to a particular object element of the hierarchy: adding, by way of the GUI, a representation of a new child element to the hierarchy as a child of the particular object element.

In some embodiments, all elements in the hierarchy also have respective names, and are also associated with name change controls. These embodiments may further involve, possibly in response to selection of a name control corresponding to a second particular element of the hierarchy: displaying, by way of the GUI, a widget that allows textual specification of a new name, and changing a name of the second particular element as displayed on the GUI to be the new name.

In some embodiments, elements in the hierarchy are also associated with delete controls. These embodiments may further involve, possibly in response to selection of a delete control associated with a second particular element of the hierarchy: removing, from the hierarchy, the second particular element, and displaying, by way of the GUI, the hierarchy without the second particular element.

In some embodiments, object elements in the hierarchy are associated with respective toggle controls. These embodiments may further involve, possibly in response to selection of a toggle control associated with a second particular element of the hierarchy: switching between expanding and collapsing the child elements of the second particular element, where the child elements are displayed on the GUI when expanded, and where the child elements are not displayed on the GUI when collapsed.

In some embodiments, the GUI displays the elements of the hierarchy as a vertical stack, and child elements are disposed beneath and horizontally indented in relation to their respective object elements.

Some embodiments may further involve associating a representation of the complex data object as defined by the hierarchy to input or output of a user-defined orchestration action, where the user-defined orchestration action is capable of being incorporated into a user-defined workflow that specifies a sequence of actions to be performed and relationships therebetween. These embodiments may also involve providing a representation of a second GUI that allows: the user-defined orchestration action to be integrated into the user-defined workflow, and an output data structure from a previous action in the user-defined workflow to be used as input into the user-defined orchestration action. In some embodiments, using the output data structure as input into the user-defined orchestration action is specified by the second GUI allowing a user to drag a user interface widget of the second GUI representing the output data structure to a user interface area of the second GUI representing at least part of the user-defined orchestration action.

Some embodiments may further involve writing, to the persistent storage, a representation of the complex data object as defined by the hierarchy.

In some embodiments, a computational instance of a remote network management platform contains the persistent storage, where the GUI is provided to a client device, and where the client device is associated with a managed network that is managed by the computational instance.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
 persistent storage defining primitive data types and compound data types, wherein the compound data types include objects and arrays, wherein the objects are capable of containing user-defined sets of member elements that have various primitive data types, compound data types, or both, and wherein the arrays are capable of containing user-defined sets of member elements that all have one particular primitive data type or compound data type; and one or more processors configured to:
provide a representation of a graphical user interface (GUI) for designing a hierarchy of elements corresponding to a complex data object, each of the elements therein having a respective data type that is either one of the primitive data types or one of the compound data types, wherein all elements in the hierarchy are associated with data type change controls, and wherein object elements in the hierarchy are: (i) associated with respective new child element controls, and (ii) represented as collapsible menu items that can either display or hide their respective child elements;

in response to selection of a data type change control corresponding to a particular element of the hierarchy: display, by way of the GUI, a menu that allows selection of a new data type from a list of data types, and change the data type of the particular element as displayed on the GUI to be the new data type; and in response to selection of a new child element control corresponding to a particular object element of the hierarchy: add, by way of the GUI, a representation of a new child element to the hierarchy as a child of the particular object element.

2. The system of claim 1, wherein all elements in the hierarchy also have respective names, and are also associated with name change controls, and wherein the one or more processors are further configured to:
in response to selection of a name control corresponding to a second particular element of the hierarchy: display, by way of the GUI, a widget that allows textual specification of a new name, and change a name of the second particular element as displayed on the GUI to be the new name.

3. The system of claim 1, wherein all elements in the hierarchy are also associated with delete controls, and wherein the one or more processors are further configured to:
in response to selection of a delete control associated with a second particular element of the hierarchy: remove, from the hierarchy, the second particular element, and display, by way of the GUI, the hierarchy without the second particular element.

4. The system of claim 1, wherein object elements in the hierarchy are associated with respective toggle controls, and wherein the one or more processors are further configured to:
in response to selection of a toggle control associated with a second particular element of the hierarchy: switch between expanding and collapsing the child elements of the second particular element, wherein the child elements are displayed on the GUI when expanded, and wherein the child elements are not displayed on the GUI when collapsed.

5. The system of claim 1, wherein the GUI displays the elements of the hierarchy as a vertical stack, and wherein child elements are disposed beneath and horizontally indented in relation to their respective object elements.

6. The system of claim 1, wherein the one or more processors are further configured to:
write, to the persistent storage, a representation of the complex data object as defined by the hierarchy.

7. The system of claim 1, wherein a computational instance of a remote network management platform contains the persistent storage and the one or more processors, wherein the GUI is provided to a client device, and wherein the client device is associated with a managed network that is managed by the computational instance.

8. The system of claim 1, wherein the one or more processors are further configured to:
associate a representation of the complex data object as defined by the hierarchy to input or output of a user-defined orchestration action, wherein the user-defined orchestration action is capable of being incorporated into a user-defined workflow that specifies a sequence of actions to be performed and relationships therebetween.

9. The system of claim 8, wherein the one or more processors are further configured to:
provide a representation of a second GUI that allows: the user-defined orchestration action to be integrated into the user-defined workflow, and an output data structure from a previous action in the user-defined workflow to be used as input into the user-defined orchestration action.

10. The system of claim 9, wherein using the output data structure as input into the user-defined orchestration action is specified by the second GUI allowing a user to drag a user interface widget of the second GUI representing the output data structure to a user interface area of the second GUI representing at least part of the user-defined orchestration action.

11. A computer-implemented method comprising:
obtaining, from persistent storage, definitions of primitive data types and compound data types, wherein the compound data types include objects and arrays, wherein the objects are capable of containing user-defined sets of member elements that have various primitive data types, compound data types, or both, and wherein the arrays are capable of containing user-defined sets of member elements that all have one particular primitive data type or compound data type;

providing, by a computing device, a representation of a graphical user interface (GUI) for designing a hierarchy of elements corresponding to a complex data object, each of the elements therein having a respective data type that is either one of the primitive data types or one of the compound data types, wherein all elements in the hierarchy are associated with data type change controls, and wherein object elements in the hierarchy are: (i) associated with respective new child element controls, and (ii) represented as collapsible menu items that can either display or hide their respective child elements;

in response to selection of a data type change control corresponding to a particular element of the hierarchy: displaying, by way of the GUI, a menu that allows selection of a new data type from a list of data types, and changing the data type of the particular element as displayed on the GUI to be the new data type; and in response to selection of a new child element control corresponding to a particular object element of the hierarchy: adding, by way of the GUI, a representation of a new child element to the hierarchy as a child of the particular object element.

12. The computer-implemented method of claim 11, wherein all elements in the hierarchy also have respective names, and are also associated with name change controls, the computer-implemented method further comprising:

in response to selection of a name control corresponding to a second particular element of the hierarchy: displaying, by way of the GUI, a widget that allows textual specification of a new name, and changing a name of the second particular element as displayed on the GUI to be the new name.

13. The computer-implemented method of claim 11, wherein elements in the hierarchy are also associated with delete controls, the computer-implemented method further comprising:

in response to selection of a delete control associated with a second particular element of the hierarchy: removing, from the hierarchy, the second particular element, and displaying, by way of the GUI, the hierarchy without the second particular element.

14. The computer-implemented method of claim 11, wherein object elements in the hierarchy are associated with respective toggle controls, the computer-implemented method further comprising:

in response to selection of a toggle control associated with a second particular element of the hierarchy: switching between expanding and collapsing the child elements of the second particular element, wherein the child elements are displayed on the GUI when expanded, and wherein the child elements are not displayed on the GUI when collapsed.

15. The computer-implemented method of claim 11, wherein the GUI displays the elements of the hierarchy as a vertical stack, and wherein child elements are disposed beneath and horizontally indented in relation to their respective object elements.

16. The computer-implemented method of claim 11, further comprising:

associating a representation of the complex data object as defined by the hierarchy to input or output of a user-defined orchestration action, wherein the user-defined orchestration action is capable of being incorporated into a user-defined workflow that specifies a sequence of actions to be performed and relationships therebetween.

17. The computer-implemented method of claim 16, further comprising:

providing a representation of a second GUI that allows: the user-defined orchestration action to be integrated into the user-defined workflow, and an output data structure from a previous action in the user-defined workflow to be used as input into the user-defined orchestration action.

18. The computer-implemented method of claim 17, wherein using the output data structure as input into the user-defined orchestration action is specified by the second GUI allowing a user to drag a user interface widget of the second GUI representing the output data structure to a user interface area of the second GUI representing at least part of the user-defined orchestration action.

19. An article of manufacture including a non-transitory computer-readable medium, having stored thereon program instructions that, upon execution by a computing system, cause the computing system to perform operations comprising:

obtaining, from persistent storage, definitions of primitive data types and compound data types, wherein the compound data types include objects and arrays, wherein the objects are capable of containing user-defined sets of member elements that have various primitive data types, compound data types, or both, and wherein the arrays are capable of containing user-defined sets of member elements that all have one particular primitive data type or compound data type;

providing, by the computing system, a representation of a graphical user interface (GUI) for designing a hierarchy of elements corresponding to a complex data object, each of the elements therein having a respective data type that is either one of the primitive data types or one of the compound data types, wherein all elements in the hierarchy are associated with data type change controls, and wherein object elements in the hierarchy are: (i) associated with respective new child element controls, and (ii) represented as collapsible menu items that can either display or hide their respective child elements;

in response to selection of a data type change control corresponding to a particular element of the hierarchy: displaying, by way of the GUI, a menu that allows selection of a new data type from a list of data types, and change the data type of the particular element as displayed on the GUI to be the new data type; and in response to selection of a new child element control corresponding to a particular object element of the hierarchy: adding, by way of the GUI, a representation of a new child element to the hierarchy as a child of the particular object element.

20. The article of manufacture of claim 19, wherein the GUI displays the elements of the hierarchy as a vertical stack, and wherein child elements are disposed beneath and horizontally indented in relation to their respective object elements.

* * * * *